(12) United States Patent
Arimilli et al.

(10) Patent No.: US 7,454,580 B2
(45) Date of Patent: Nov. 18, 2008

(54) DATA PROCESSING SYSTEM, PROCESSOR AND METHOD OF DATA PROCESSING THAT REDUCE STORE QUEUE ENTRY UTILIZATION FOR SYNCHRONIZING OPERATIONS

(75) Inventors: Ravi K. Arimilli, Austin, TX (US);
Thomas M. Capasso, Austin, TX (US);
Robert A. Cargnoni, Austin, TX (US);
Guy L. Guthrie, Austin, TX (US);
Hugh Shen, Round Rock, TX (US);
William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/380,020

(22) Filed: Apr. 25, 2006

(65) Prior Publication Data
US 2007/0250669 A1    Oct. 25, 2007

(51) Int. Cl.
*G06F 12/00*  (2006.01)
*G06F 13/00*  (2006.01)
*G06F 13/28*  (2006.01)
*G06F 9/26*   (2006.01)
*G06F 9/34*   (2006.01)

(52) U.S. Cl. .................... 711/156; 711/129; 711/151; 711/216

(58) Field of Classification Search .................. None
See application file for complete search history.

(56) References Cited

U.S. PATENT DOCUMENTS

| | | | |
|---|---|---|---|
| 6,748,501 B2 * | 6/2004 | Arimilli et al. | 711/155 |
| 2006/0026309 A1 * | 2/2006 | Day et al. | 710/22 |
| 2006/0179226 A1 * | 8/2006 | Guthrie et al. | 711/125 |

* cited by examiner

*Primary Examiner*—Reginald G. Bragdon
*Assistant Examiner*—Eric S Cardwell
(74) *Attorney, Agent, or Firm*—Libby Z. Handelsman; Dillon & Yudell LLP

(57) ABSTRACT

A data processing system includes a processor core and a memory subsystem. The memory subsystem includes a store queue having a plurality of entries, where each entry includes an address field for holding the target address of store operation, a data field for holding data for the store operation, and a virtual sync field indicating a presence or absence of a synchronizing operation associated with the entry. The memory subsystem further includes a store queue controller that, responsive to receipt at the memory subsystem of a sequence of operations including a synchronizing operation and a particular store operation, places a target address and data of the particular store operation within the address field and data field, respectively, of an entry in the store queue and sets the virtual sync field of the entry to represent the synchronizing operation, such that a number of store queue entries utilized is reduced.

19 Claims, 17 Drawing Sheets

DATA PROCESSING SYSTEM, PROCESSOR AND METHOD OF DATA PROCESSING THAT REDUCE STORE QUEUE ENTRY UTILIZATION FOR SYNCHRONIZING OPERATIONS

CROSS-REFERENCE TO RELATED APPLICATION

The present application is related to commonly assigned co-pending U.S. patent application Ser. No. 11/380,018; filed on the same date herewith and incorporated herein by reference in its entirety.

BACKGROUND OF THE INVENTION

1. Technical Field

The present invention relates generally to data processing, and in particular, to memory access operations. Still more particularly, the present invention relates to a data processing system, processor and method of data processing that supports processing of program code exhibiting differing memory models.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then access lower-level caches (e.g., level two (L2) or level three (L3) caches) for the requested memory block. The lowest level cache (e.g., L3) is often shared among several processor cores.

In such data processing systems, it is typical that the memory subsystem and associated access logic supports only a single memory model, that is, a single set of rules regarding the ordering that must be observed between memory modifying operations (e.g., store operations) executed within the same processing unit and different processing units. For example, some architectures enforce so-called "strong" ordering between stores, meaning that the store operations of each processor core must be performed by the memory subsystem according to the program order of the associated store instructions executed by the processor core. Other architectures permit so called "weak" ordering between stores, meaning that the store operations of each processor core are permitted to be performed out-of-order with respect to the program order of the associated store instruction executed by the processor core. Because program code is generally written assuming a particular memory model, differences between memory models implemented by different data processing systems can prevent program code from being easily ported between systems implementing diverse memory models.

SUMMARY OF THE INVENTION

The present invention provides a data processing system, processor and method of data processing that supports processing of program code exhibiting differing memory models. In one embodiment, a data processing system includes a memory subsystem and an execution unit, coupled to the memory subsystem, which executes store instructions to determine target memory addresses of store operations to be performed by the memory subsystem. The data processing system further includes a mode field having a first setting indicating strong ordering between store operations and a second setting indicating weak ordering between store operations. Store operations accessing the memory subsystem are associated with either the first setting or the second setting. The data processing system also includes logic that, based upon settings of the mode field, inserts a synchronizing operation between a store operation associated with the first setting and a store operation associated with the second setting, such that all store operations preceding the synchronizing operation complete before store operations subsequent to the synchronizing operation.

In another embodiment, a data processing system includes a processor core and a memory subsystem. The memory subsystem includes a store queue having a plurality of entries, where each entry includes an address field for holding the target address of store operation, a data field for holding data for the store operation, and a virtual sync field indicating a presence or absence of a synchronizing operation associated with the entry. The memory subsystem further includes a store queue controller that, responsive to receipt at the memory subsystem of a sequence of operations including a synchronizing operation and a particular store operation, places a target address and data of the particular store operation within the address field and data field, respectively, of an entry in the store queue and sets the virtual sync field of the entry to represent the synchronizing operation, such that a number of store queue entries utilized is reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
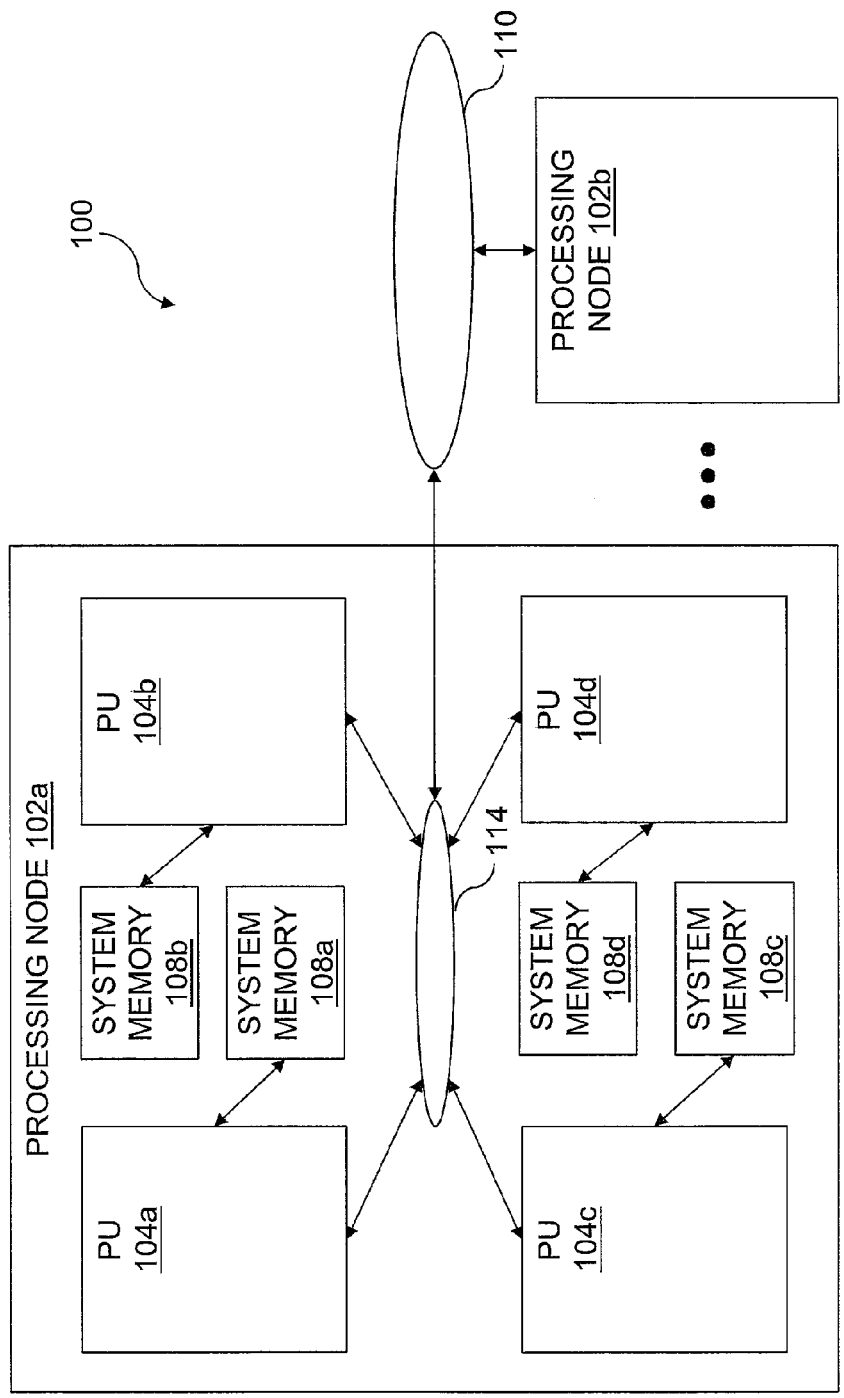
FIG. 1 is a high-level block diagram of an exemplary data processing system in accordance with the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

As described below in greater detail with reference to FIG. 2, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
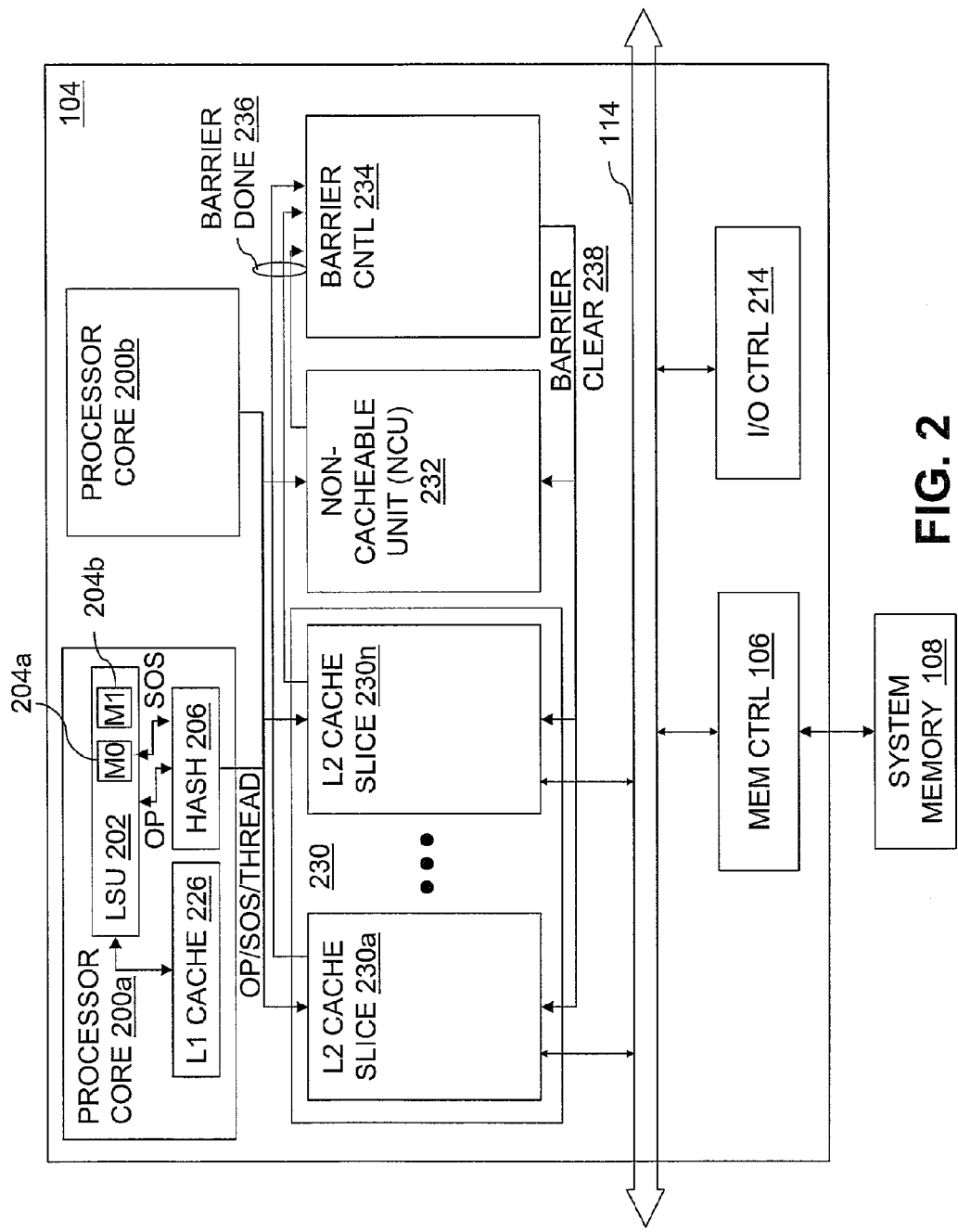
FIG. 2 is a more detailed block diagram of an exemplary processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. As depicted, each processor core 200 includes one or more execution units, such as load-store unit (LSU) 202, for executing instructions. The instructions executed by LSU 202 include memory access instructions that request access to a memory block or cause the generation of a request for access to a memory block.

Each processor core 202 supports multiple (in one embodiment, two) concurrent hardware threads of execution. In accordance with the present invention, each such hardware thread has an associated dynamically modifiable, software-accessible mode field (e.g., mode field M0 204a for thread 0 and mode field M1 204b for thread 1) that controls a memory model then implemented by that hardware thread. For example, each mode field 204 can be implemented as a single mode bit for which a value of "0" represents a weak memory model that, absent a barrier operation, permits store accesses to memory to be performed out-of-order with respect to the program order of the associated store instruction(s) and a value of "1" represents a strong memory model requiring store accesses to memory to be performed in-order with respect to the program order of the associated store instruction(s).

The operation of each processor core 200 is supported by a multi-level volatile memory hierarchy having at its lowest level shared system memory 108, and at its upper levels one or more levels of cache memory, which in the illustrative embodiment include a store-through level one (L1) cache 226 within and private to each processor core 200, and a respective store-in level two (L2) cache 230 shared by processor cores 200a, 200b. In order to efficiently handle multiple concurrent memory access requests to cacheable addresses, L2 cache 230 is implemented with multiple L2 cache slices 230a-230n, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Processing unit 104 further includes a non-cacheable unit (NCU) 232 that performs memory accesses to non-cacheable real memory addresses and a barrier controller 234 that enforces barrier operations that synchronize store operations across L2 cache slices 230a-230n and NCU 232. As indicated, to support such synchronization, barrier controller 234 is coupled to each of L2 cache slices 230a-230n and NCU 232 by a respective one of barrier done signals 236 and is coupled to all of L2 cache slices 230a-230n and NCU 232 by a barrier clear signal 238.

Each processing unit 104 further includes an integrated I/O (input/output) controller 214 supporting the attachment of one or more I/O devices. I/O controller 214 may issue read and write operations on its local interconnect 114 and system interconnect 110, for example, in response to requests by attached I/O device (not depicted).

In operation, when a hardware thread of execution under execution by a processor core 200 includes a memory access instruction requesting a specified memory access operation to be performed, LSU 202 executes the memory access instruction to determine the target real address of the memory access operation. LSU 202 then transmits to hash logic 206 with its processor core 200 at least the memory access operation (OP), which includes at least a transaction type (ttype) and a target real address, and a strongly ordered store (SOS) indication, which indicates whether the mode field 204 for the relevant hardware thread is implementing a strong or weak memory model. Hash logic 206 hashes the target real address to identify the appropriate destination (e.g., L2 cache slice 230a-230n or NCU 232) and dispatches the operation and the SOS indication to the destination, as discussed further below.

Figure 3:
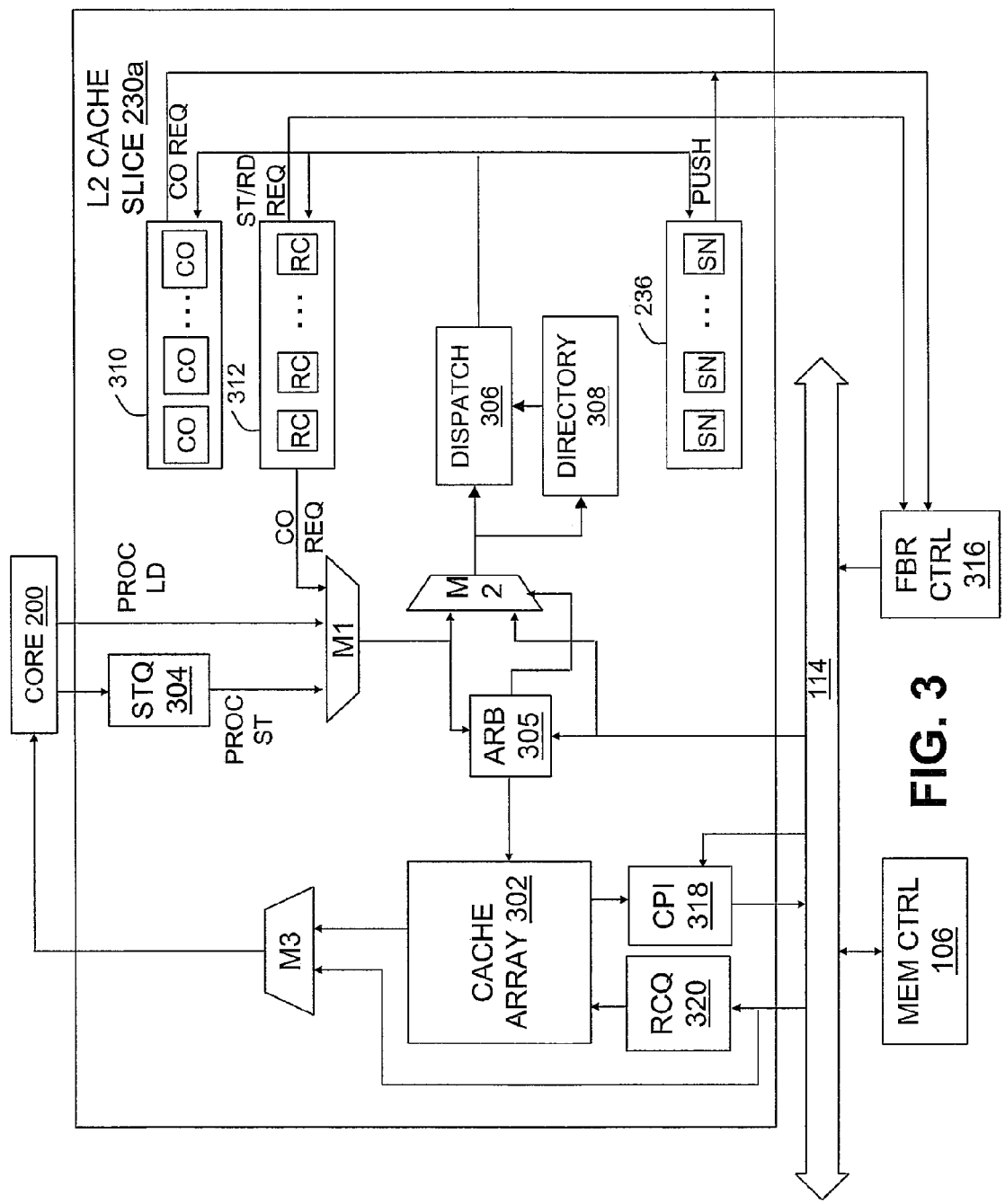
FIG. 3 is a more detailed block diagram of an L2 cache slice in accordance with the present invention.

With reference now to FIG. 3, there is illustrated a more detailed block diagram of an exemplary embodiment of one of L2 cache slice 230a-230n (in this case, L2 cache slice 230a) in accordance with the present invention. As shown in FIG. 3, L2 cache slice 230a includes a cache array 302 and a directory 308 of the contents of cache array 302. Assuming cache array 302 and directory 308 are set associative as is conventional, memory locations in system memories are mapped to particular congruence classes within cache array 302 utilizing predetermined index bits within the system memory (real) addresses. The particular memory blocks stored within cache array 302 are recorded in cache directory 308, which contains one directory entry for each cache line in cache array 302. While not expressly depicted in FIG. 3, it will be understood by those skilled in the art that each directory entry in cache directory 308 includes various entry identifier and indexing fields such as tag fields for using a tag portion of the corresponding real address to specify the particular cache line stored in cache array 302, state fields that indicate the coherency state of the cache lines, and a LRU (Least Recently Used) field indicating a replacement order for the cache line with respect to other cache lines in the same congruence class.

L2 cache slice 230a further includes arbiter logic 305 that controls multiplexers M1 and M2 to arbitrate the order of processing of memory access requests received from core 200 and local interconnect 114. Memory access requests, including read and store operations, are forwarded in accordance with the arbitration policy implemented by arbiter 305 to a dispatch pipeline 306 where each read and store request is processed with respect to directory 308 over a given number of cycles.

As further shown in FIG. 3, L2 cache slice 230a also comprises RC (read claim) machines 312 that can each independently and concurrently handle a processor memory access requests received from the local processor core 200, snoop machines 236 that can each independently and concurrently handle a memory access request "snooped" from local interconnect 114, and CO (castout) machines 310 that manage the removal and writeback of memory blocks from cache array 302.

L2 cache slice 230a further includes an RC queue 320 and a CPI (castout push intervention) queue 318 that buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 236, such that each CO machine 310 and each snooper 236 that is dispatched retrieves data from only the respective designated CPI buffer entry. Data read out from cache array 302 or received from local interconnect 114 is transmitted to an associated processor core 200 via multiplexer M3.

Figure 4:
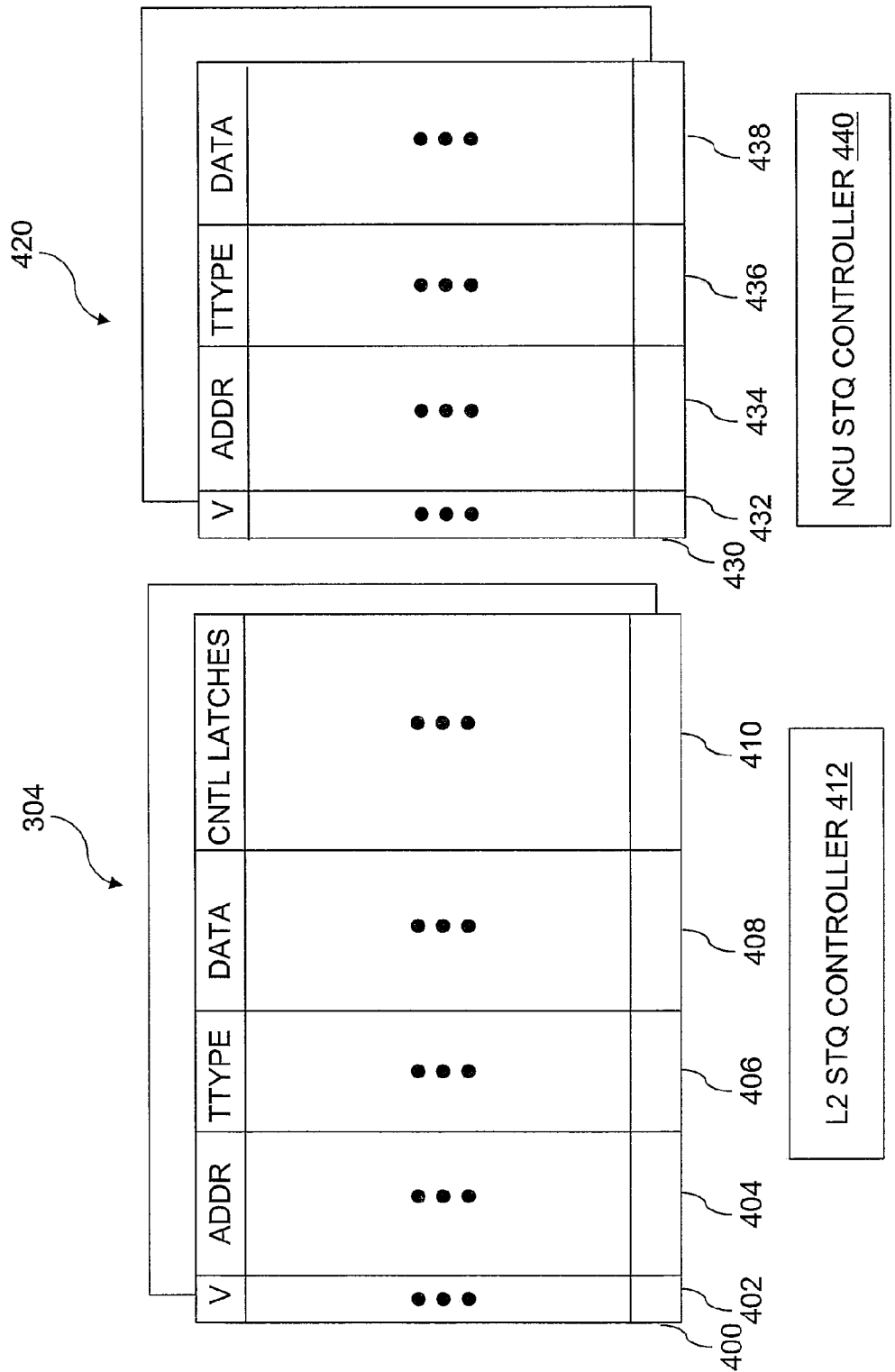
FIG. 4A is a more detailed block diagram of an exemplary embodiment of the L2 store queue of FIG. 3.
FIG. 4B is a more detailed block diagram of an exemplary embodiment of the non-cacheable unit (NCU) store queue of FIG. 2.

Referring now to FIG. 4A, there is illustrated a more detailed block diagram of an L2 store queue 304 within an L2 cache slice 230a-230n in accordance with the present invention. As shown, L2 store queue (STQ) 304 includes L2 STQ controller 412 and buffer storage for each hardware thread supported by the associated processor cores 200. The buffer storage for each thread includes multiple entries 400 each having a number of fields for holding information for a particular operation. The fields of each entry 400 include a valid (V) field 402 indicating the validity of the contents of the entry 400, an address (ADDR) field 404 for holding the target address of an operation, a transaction type (ttype) field 406 for holding a transaction type of an operation, a data field 408 for holding data, if any, of the operation, and control latches 410.

With reference now to FIG. 4B, there is illustrated a block diagram of a similar store queue 420 within NCU 232 in accordance with the present invention. As shown, the store queue 420 of NCU 232 includes NCU STQ controller 440 and buffer storage for each hardware thread supported by the associated processor cores 200. The buffer storage for each thread includes multiple entries 430 each having a number of fields for holding information for a particular operation. In general, it is preferable if the number of entries 430 is less than the number of entries 400 in L2 STQ 304 because non-cacheable store operations are typically less prevalent than cacheable store operations. The fields of each entry 430 include a valid (V) field 432 indicating the validity of the contents of the entry 430, an address (ADDR) field 434 for holding the target address of an operation, a transaction type (ttype) field 436 for holding a transaction type of an operation, and a data field 438 for holding data, if any, of the operation. In one preferred embodiment that will hereafter be assumed, NCU STQ controller 440 dispatches non-cacheable store operations from entries 430 in first-in, first-out (FIFO) order.

Figure 5:
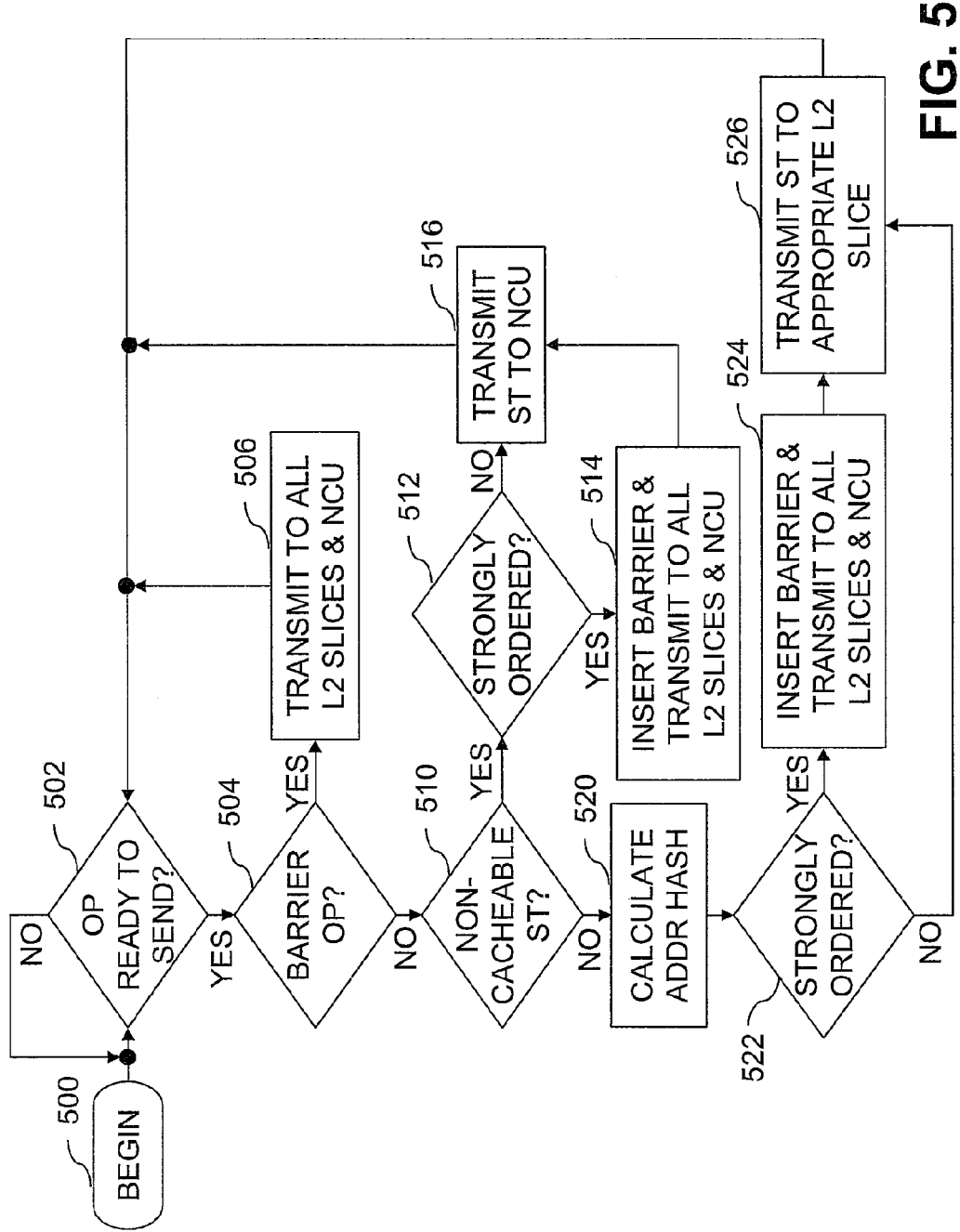
FIG. 5 is a high level logical flowchart of an exemplary process of dispatching operations to the memory subsystem in accordance with the present invention.

Referring now to FIG. 5, there is depicted a high level logical flowchart of an exemplary process by which hash logic 206 dispatches store and barrier operations to the memory subsystem in accordance with the present invention. The process begins at block 500 and then proceeds to block 502, which illustrates hash logic 206 iterating until a store or barrier operation is received from LSU 202. In response to receipt of a store or barrier operation to dispatch, the process passes from block 502 to block 504, which depicts hash logic 206 determining from the ttype of the operation received from LSU 202 whether the operation is a barrier operation that synchronizes store operations across all L2 cache slices 230a-230n and NCU 232. If hash logic 206 determines at block 504 that the operation received from LSU 202 is a barrier operation, the process passes to block 506, which illustrates hash logic 206 transmitting the barrier operation (together with a thread indication) to all L2 cache slices 230a-230n and NCU 232. Thereafter, the process returns to block 502.

Returning to block 504, in response to a determination that the operation received from LSU 202 is not a barrier operation, hash logic 206 also determines at block 510 whether or not the ttype of the operation indicates that the operation is a non-cacheable store operation targeting a non-cacheable real address. If so, hash logic 206 also determines at block 512 whether or not LSU 202 asserted the SOS indication associated with the operation. If not, hash logic 206 transmits the non-cacheable store operation to NCU 232 for processing together with a thread indication, as indicated at block 516. Thereafter, the process returns to block 502. If, however, hash logic 206 determines at block 512 that LSU 202 asserted the SOS indication associated with the operation received at block 502, hash logic 206 inserts a barrier operation into the operation flow of the thread and transmits the barrier operation to all L2 cache slices 230a-230n and to NCU 232 together with a thread indication in order to ensure that all store operations in the thread preceding the barrier operation are performed before any subsequent store operation in the thread is performed (block 514). Thereafter, hash logic 206 transmits the strongly ordered non-cacheable store operation and thread indication to NCU 232, as shown at block 516. Thereafter, the process returns to block 502.

Referring again to block 510, in response to a determination that the operation received from LSU 202 is not a barrier operation or a non-cacheable store operation, but is instead a cacheable store operation, the process passes to block 520. Block 520 depicts hash logic 206 hashing the real address specified by the cacheable store operation to identify the appropriate one of L2 cache slices 230a-230n to process the cacheable store operation. Hash logic 206 also determines at block 522 whether or not LSU 202 asserted the SOS indication in conjunction with the operation. If not, hash logic 206 transmits the cacheable store operation and a thread indication to the appropriate one of L2 cache slices 230a-230n for processing, as indicated at block 526. Thereafter, the process returns to block 502. If, however, hash logic 206 determines at block 522 that LSU 202 asserted the SOS indication associated with the operation received at block 502, hash logic 206 inserts a barrier operation into the operation flow of the thread and transmits the barrier operation and thread indication to all L2 cache slices 230a-230n and to NCU 232 in order to ensure that all store operations in the thread preceding the barrier operation are performed before any subsequent store operation is performed (block 524). Thereafter, hash logic 206 transmits the strongly ordered cacheable store operation and thread indication to the appropriate one of L2 cache slices 230a-230n, as shown at block 526. Thereafter, the process returns to block 502.

Figure 6:
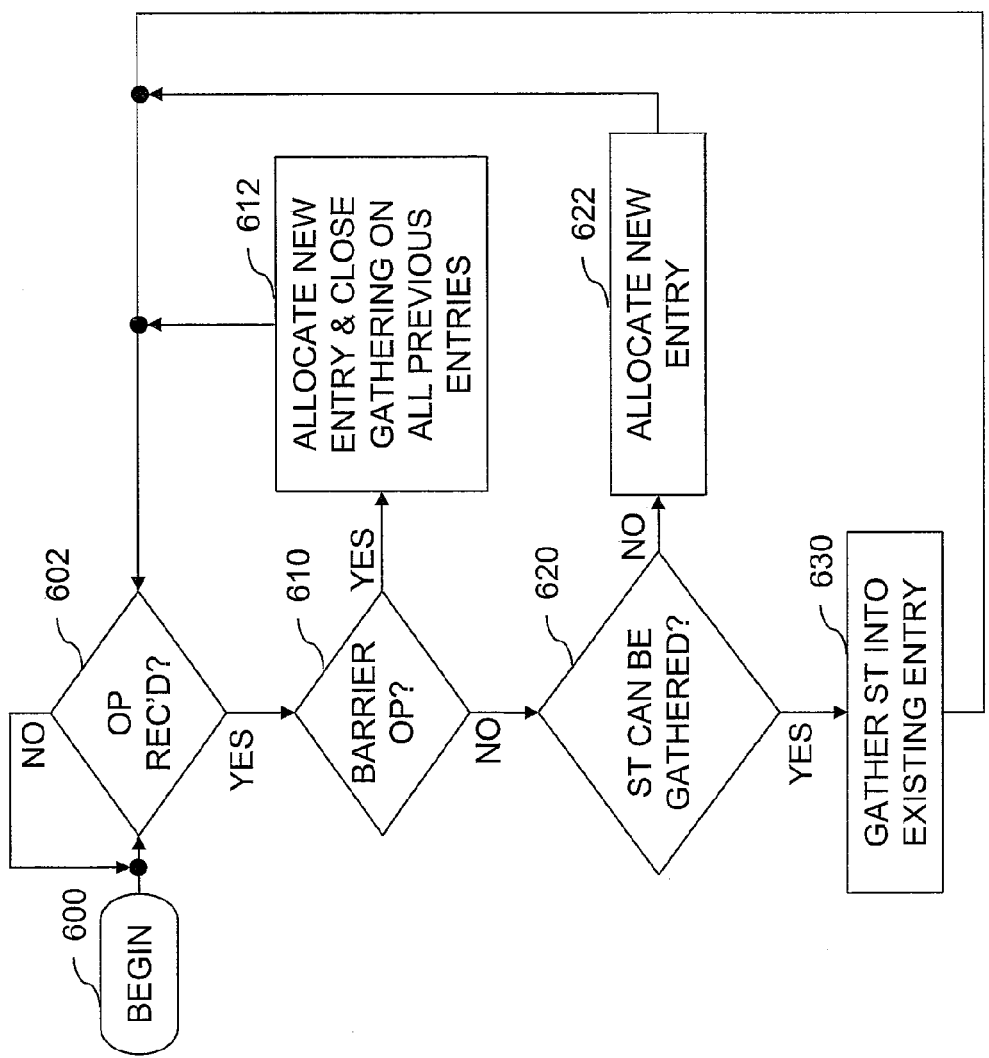
FIG. 6 is a high level logical flowchart of an exemplary process of enqueuing an operation in an L2 store queue in accordance with the present invention.

With reference now to FIG. 6, there is illustrated a high level logical flowchart of an exemplary process of enqueuing an operation received from hash logic 206 within the L2 store queue 304 of one of L2 cache slices 230a-230n in accordance with the present invention. The illustrated process begins at block 600 and iterates at block 602 until an operation is received from hash logic 206. In response to receipt of an operation, the process passes to block 610, which depicts L2 STQ controller 412 determining from the ttype of the received operation whether or not the operation is a barrier operation. If so, L2 STQ controller 412 allocates a new entry 400 to the barrier operation in the buffer storage for the appropriate thread and populates valid field 402 and ttype field 406 (block 612). In addition, L2 STQ controller 412 closes store gathering on all previous valid entries 400 for the thread within L2 STQ 304. Thereafter, the process returns to block 602 to await receipt of a next operation.

Returning to block 610, in response to determining that the operation received at block 602 is a cacheable store operation rather than a barrier operation, L2 STQ controller 412 determines at block 620 whether or not the target real address of the cacheable store operation falls within the same memory block as the target address of a previous store operation in the same thread having a valid entry 400 in L2 STQ 304 for which store gathering has not been closed. If so, L2 STQ controller 412 determines that the present cacheable store operation can be gathered with the preceding cacheable store operation. Accordingly, L2 STQ controller 412 gathers the new cacheable store operation by merging the data of the new cacheable store operation with the contents of the data field 408 of the entry 400 allocated to the previous cacheable store operation (block 630). As will be appreciated, such store gathering advantageously saves the allocation of an additional entry 400 in L2 STQ 304. If L2 STQ controller 412 determines at block 620 that the new cacheable store operation cannot be gathered, L2 STQ controller 412 allocates a new entry 400 to the cacheable store operation in the buffer storage of the appropriate thread and populates valid field 402 (i.e., by marking the entry 400 valid), address field 404, ttype field 406, and data field 408 (block 622). Following either block 622 or block 630, the process returns to block 602.

Figure 7:
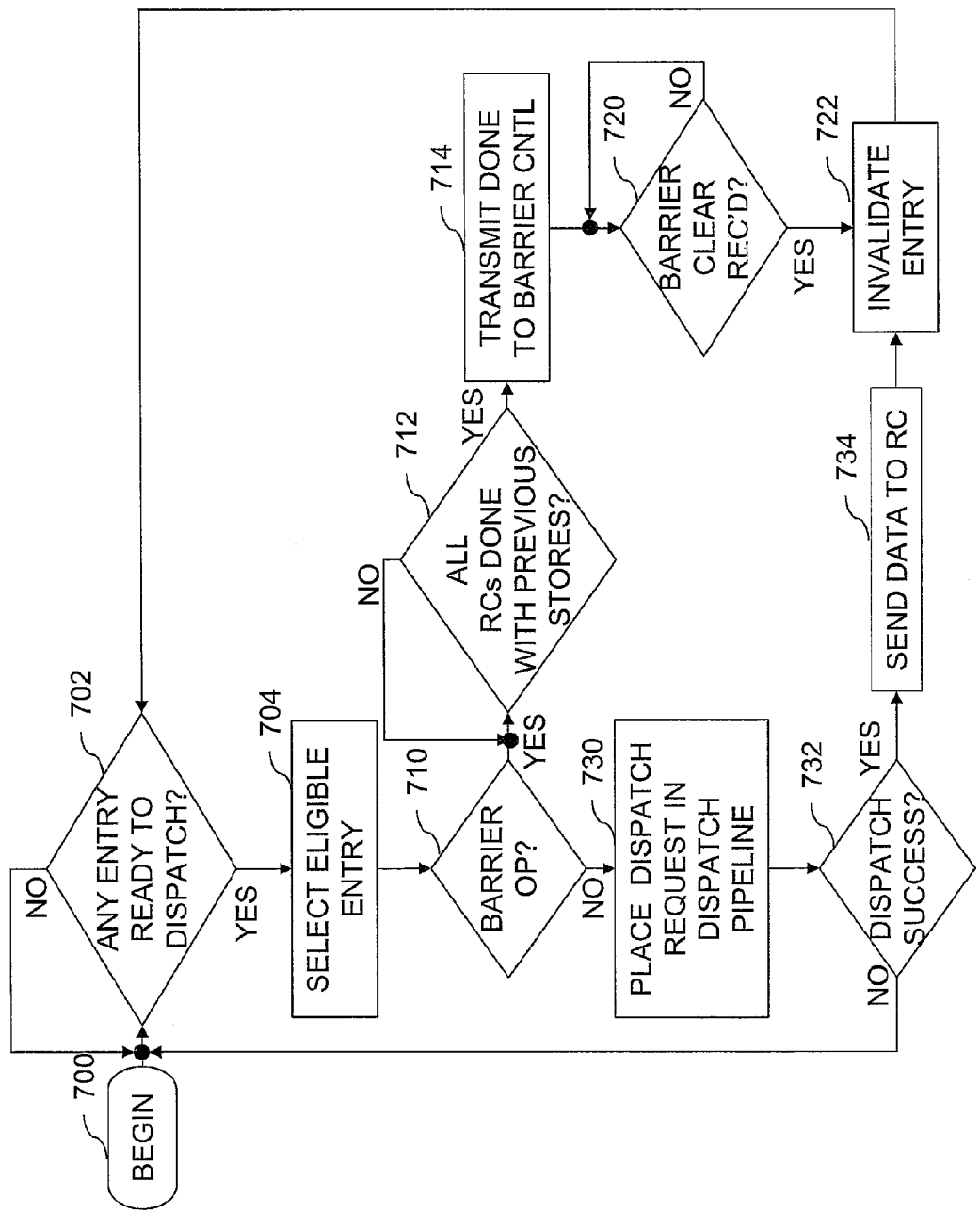
FIG. 7 is a high level logical flowchart of an exemplary process for dequeuing an operation from an L2 store queue in accordance with the present invention.

Referring now to FIG. 7, there is depicted a high level logical flowchart of an exemplary process by which an L2 STQ controller 412 dequeues an operation from the buffer storage of a thread in an L2 STQ 304 in accordance with the present invention. As depicted, the process begins at block 700 and then proceeds to block 702, which depicts L2 STQ controller 412 iterating until at least one entry 400 within the buffer storage of a particular thread in L2 STQ 304 becomes available for dispatch. In response to at least one entry 400 becoming available for dispatch, L2 STQ controller 412 selects one of the eligible entries 400 for dispatch at block 704. It will be appreciated in making the selection of an eligible entry 400, L2 STQ controller 412 observes any barrier operations that are present, meaning that L2 STQ controller 412 never dispatches a store operation in advance of a preceding barrier operation or a barrier operation in advance of a preceding store operation, but can otherwise dispatch store operations in any order.

The process then proceeds from block 704 to block 710, which illustrates L2 STQ controller 412 determining from the ttype field 406 of the selected entry 400 whether the operation is a barrier operation. If not, the process proceeds to block 730, which is described below. If, however, the selected entry 400 contains a barrier operation, L2 STQ controller 412 iterates at block 712 until all RC machines 312 have completed processing of all previous store operations. Once all previous store operations have completed, L2 STQ controller 412 asserts its barrier done signal 236, as shown at block 714, and awaits assertion of barrier clear signal 238 by barrier controller 234 at block 720. As described above, barrier controller 234 asserts barrier clear signal 238 when all of L2 cache slices 230a-230n and NCU 232 assert all of barrier done signals 236. In response to assertion of barrier clear signal 238, L2 STQ controller 412 marks the entry 400 containing the barrier operation as invalid at block 722. Thereafter, the process shown in FIG. 7 returns to block 702.

Referring now to block 730, if the operation buffered in the selected entry 400 of L2 STQ 304 is not a barrier operation but is instead a store operation, L2 STQ controller 412 places a dispatch request within dispatch pipeline 306 as shown at block 730. As illustrated at block 732, if the dispatch request is denied, for example, because of an address collision, the process returns to block 702. If, on the other hand, an indication that an RC machine 312 has been dispatched to handle the store operation is received, the process proceeds from block 732 to block 734, which illustrates L2 STQ controller 412 transmitting the contents of data field 408 to the appropriate RC machine 312 for processing. As described above, the RC machine 312 processes the store operation by storing the associated data within cache array 302. Following block 734, the process passes to blocks 722 and 702, which have been described.

Figure 8:
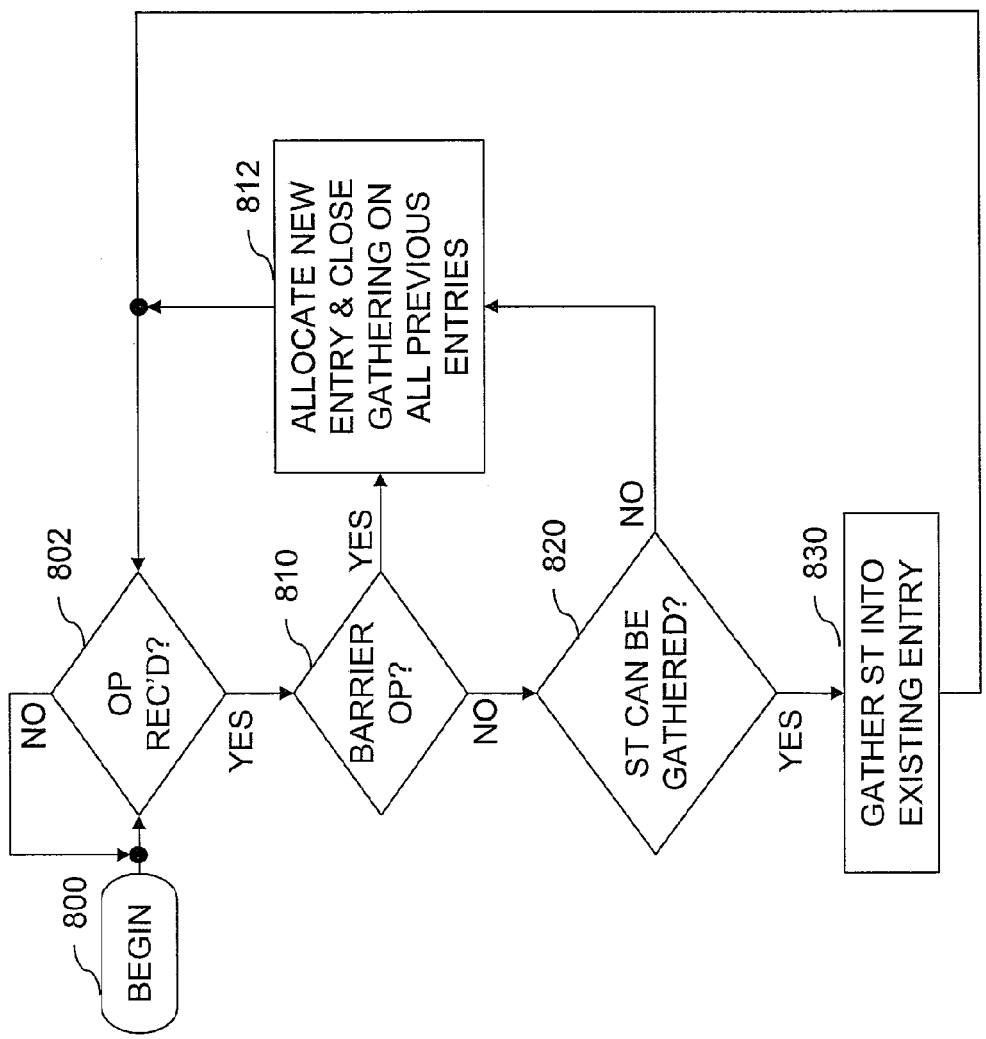
FIG. 8 is a high level logical flowchart of an exemplary process of enqueuing an operation in an NCU store queue in accordance with the present invention.

With reference now to FIG. 8, there is illustrated a high level logical flowchart of an exemplary process of enqueuing an operation in the NCU store queue 420 of NCU 232 in accordance with the present invention. The illustrated process begins at block 800 and iterates at block 802 until an operation is received from hash logic 206. In response to receipt of an operation, the process passes to block 810, which depicts NCU STQ controller 440 determining from the ttype of the received operation whether or not the operation is a barrier operation. If so, NCU STQ controller 440 allocates a new entry 430 to the barrier operation in the buffer storage for the appropriate thread and populates valid field 402 and ttype field 406 (block 812). In addition, NCU STQ controller 440 closes store gathering on all previous valid entries 430 for the thread within NCU STQ 304. Thereafter, the process returns to block 802 to await receipt of a next operation.

Returning to block 810, in response to determining that the operation received at block 802 is a non-cacheable store operation rather than a barrier operation, NCU STQ controller 440 determines at block 820 whether or not the target real address of the non-cacheable store operation falls within the same memory block as the target address of the immediately previous store operation in the same thread having a valid entry 430 and whether store gathering for the immediately previous entry is still open. If both determinations are affirmative, NCU STQ controller 440 determines that the present non-cacheable store operation can be gathered with the immediately previous non-cacheable store operation. Accordingly, NCU STQ controller 440 gathers the new non-cacheable store operation by merging the data of the new cacheable store operation with the contents of the data field 408 of the entry 430 allocated to the previous non-cacheable store operation (block 830). As will be appreciated, such store gathering advantageously saves the allocation of an additional entry 430 in NCU STQ 420. If NCU STQ controller 440 determines at block 820 that the new non-cacheable store operation cannot be gathered, NCU STQ controller 440 allocates a new entry 430 to the non-cacheable store operation in the buffer storage of the appropriate thread and populates valid field 432 (i.e., by marking the entry 430 valid), address field 434, ttype field 436, and data field 408 (block 812). In addition, because NCU STQ controller 440 enforces FIFO ordering, NCU STQ controller 440 closes store gathering on all previous store operation(s) in the same thread. Following either block 812 or block 830, the process returns to block 802.

Figure 9:
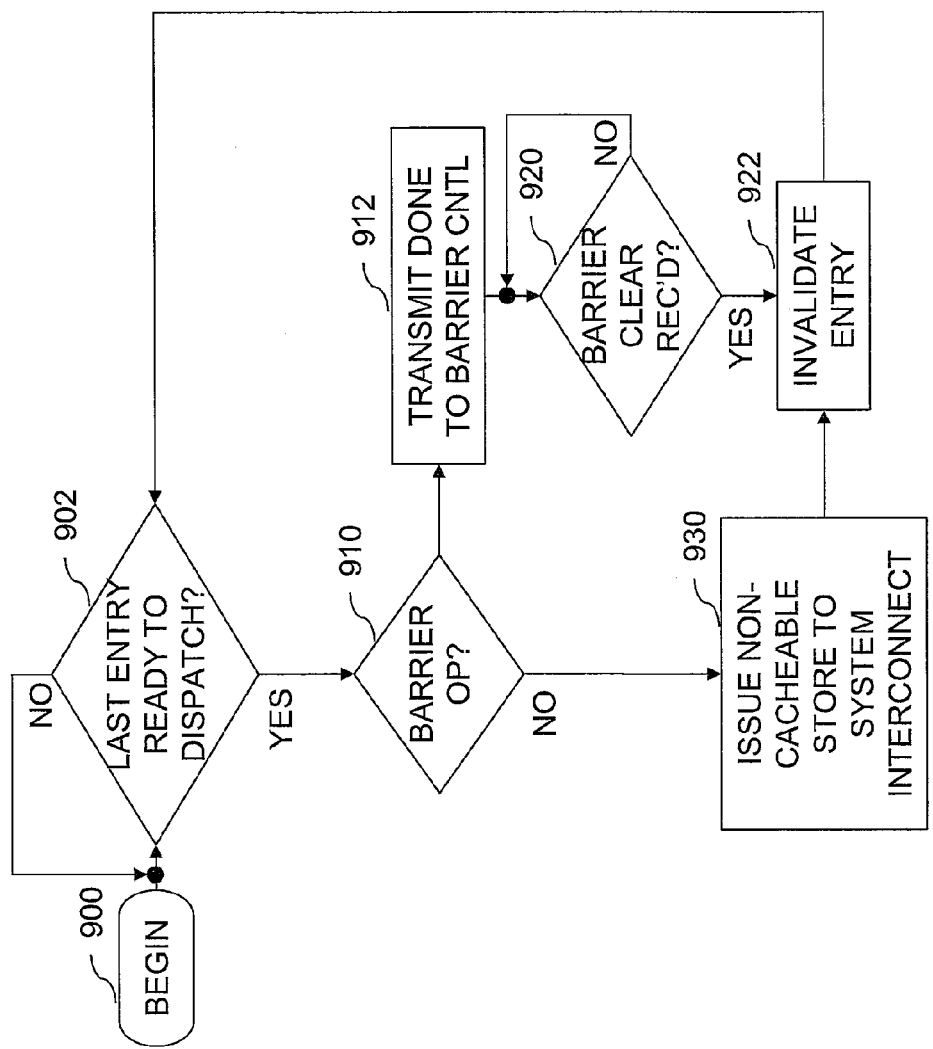
FIG. 9 is a high level logical flowchart of an exemplary process of dequeuing an operation from an NCU store queue in accordance with the present invention.

Referring now to FIG. 9, there is depicted exemplary process by which an NCU STQ controller 440 dequeues an operation from the buffer storage of a thread in an NCU STQ 420 in accordance with the present invention. As depicted, the process begins at block 900 and then proceeds to block 902, which depicts NCU STQ controller 440 iterating until the oldest entry 430 within the buffer storage of a particular thread in NCU STQ 420 becomes available for dispatch. As shown at block 910, NCU STQ controller 440 also determines from the ttype field 436 of the oldest entry 430 if the operation contained therein is a barrier operation. If not, the process proceeds to block 930, which is described below. If, however, the oldest entry 430 contains a barrier operation, NCU STQ controller 440 asserts its barrier done signal 236, as shown at block 912, and awaits assertion of barrier clear signal 238 by barrier controller 234 at block 920. As described above, barrier controller 234 asserts barrier clear signal 238 when all of L2 cache slices 230a-230n and NCU 232 assert all of barrier done signals 236. In response to assertion of barrier clear signal 238, NCU STQ controller 440 marks the entry 430 containing the barrier operation as invalid at block 922. Thereafter, the process shown in FIG. 9 returns to block 902.

Referring now to block 930, if the operation buffered in the oldest entry 430 of the buffer storage of the present thread in NCU STQ 420 is not a barrier operation but is instead a non-cacheable store operation, NCU STQ controller 440 issues the non-cacheable store operation on local interconnect 114 (and possibly system interconnect 110). Following block 930, the process passes to blocks 922 and 902, which have been described.

Figure 10:
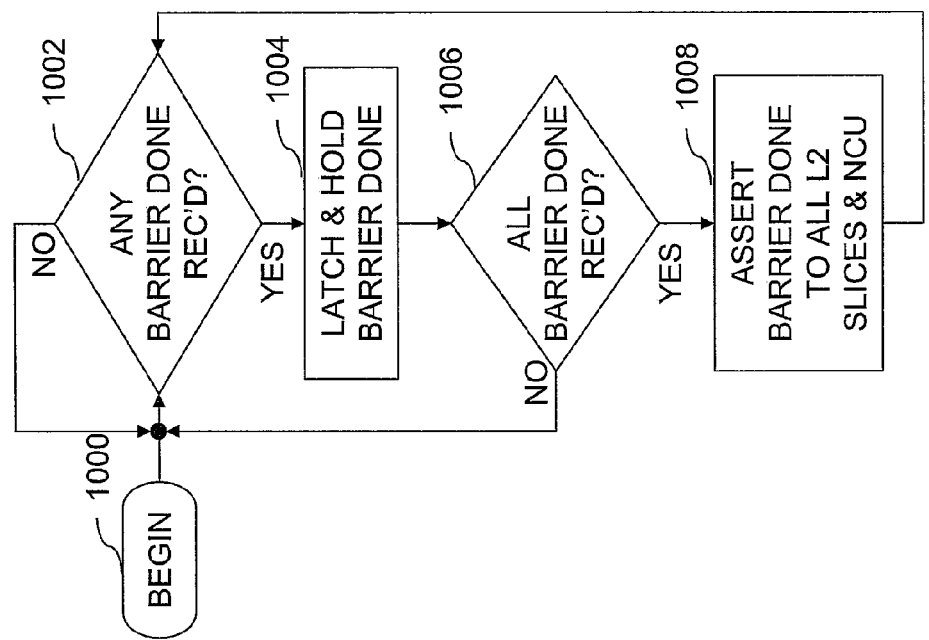
FIG. 10 is a high level logical flowchart of an exemplary process by which barrier control logic synchronizes the processing of barrier operations in accordance with the present invention.

With reference now to FIG. 10, there is illustrated a high level logical flowchart of an exemplary process by which barrier control logic 234 synchronizes the processing of barrier operations in a particular hardware thread in accordance with the present invention. The illustrated process is applicable to both barrier operations explicitly coded within the program code processed by LSU 202 and barrier operations inserted by hash logic 206.

As depicted, the process begins at block 1000 and then proceeds to block 1002, which depicts barrier control logic 234 iterating until a barrier done signal 236 is asserted by one of L2 cache slices 230a-230n or NCU 232. In response to assertion of a barrier done signal 236, barrier control logic 234 latches and holds the barrier done signal, as shown at block 1004. Thereafter, barrier control logic 234 determines at block 1006 whether or not all other barrier done signals 236 for the given hardware thread are asserted. If not, the process returns to block 1002. If, however, barrier control logic 234 determines at block 1006 that all barrier done signals 236 for the given thread have been asserted, barrier control logic 234 asserts barrier clear signal 238 to all L2 cache slices 230a-230n and NCU 232, as depicted at block 1008, to indicate that processing of the barrier operation is complete. Thereafter, the process returns to block 1002, which has been described.

In the above-described embodiment, barrier operations are inserted automatically into the operation flow of a hardware thread as needed to enforce ordering between store operations in accordance with a strong memory model. While the insertion of barrier operations in this manner permits a processor to seamlessly switch back and forth between weak and strong memory models through the judicious placement of barrier operations in the operation flow, it will be appreciated that the insertion of a significant percentage in the operation flow can effectively reduce queue depth in L2 STQs 304 and NCU SRQ 420. Accordingly, in at least some embodiments, it is advantageous to eliminate the allocation of STQ entries 400, 430 to dynamically inserted barrier operations. The modifications to the embodiment described hereinbefore to do so are described below with reference to FIGS. 11-17.

Figure 11:
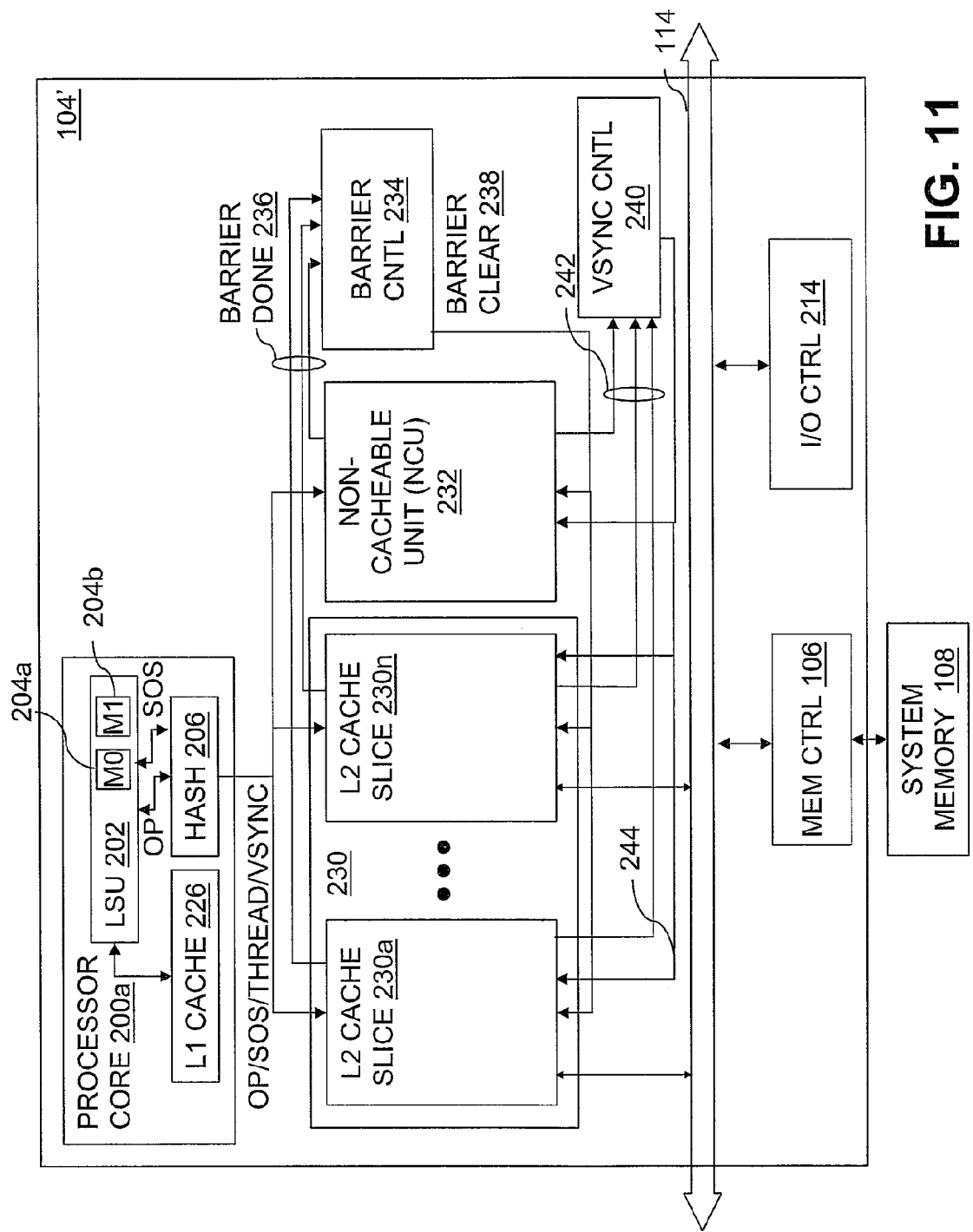
FIG. 11 is a detailed block diagram of an exemplary processing unit in accordance with a second embodiment of the present invention.
Figure 12:
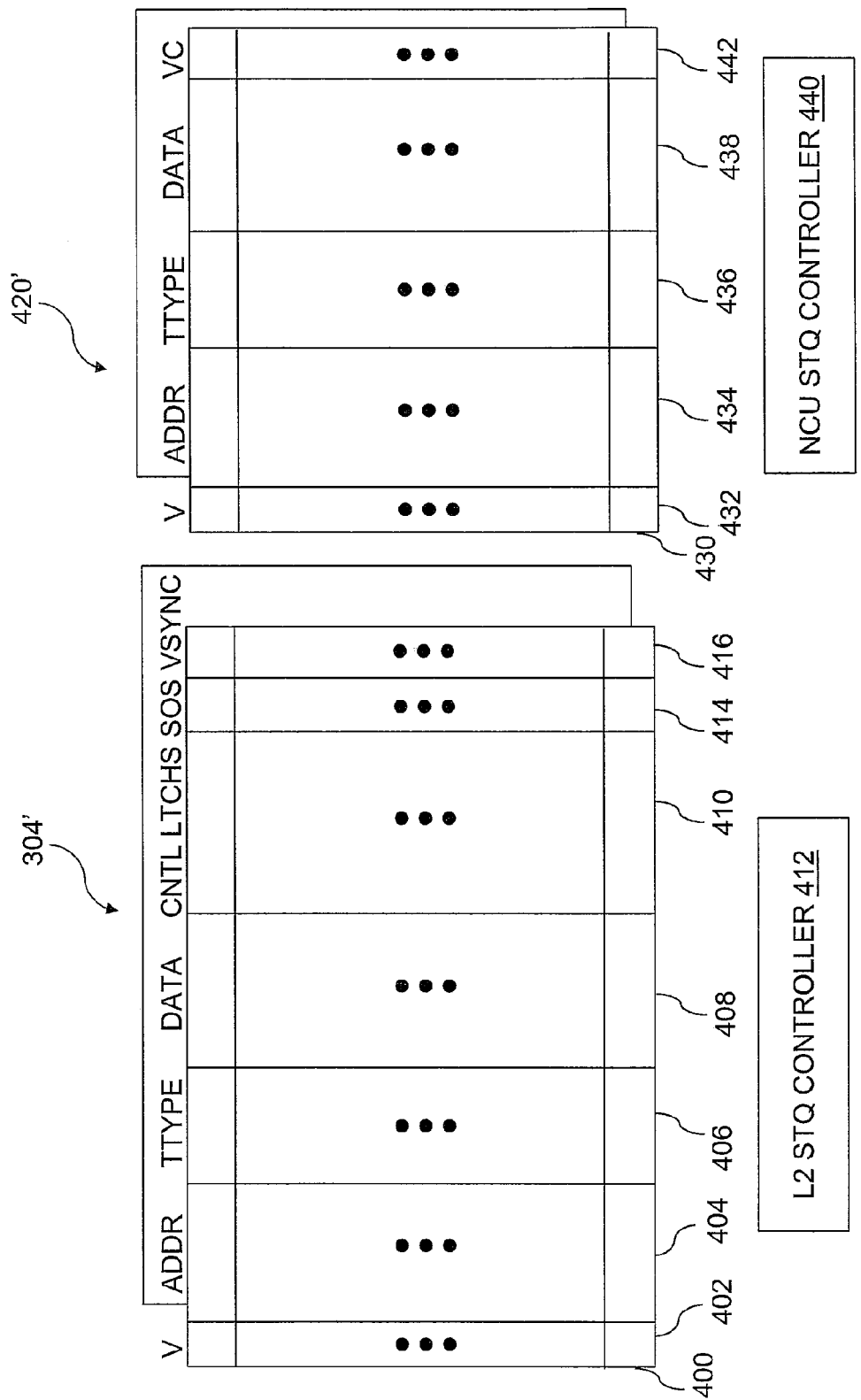
FIG. 12A is a detailed block diagram of an exemplary embodiment of the L2 store queue in the embodiment of FIG. 11.
FIG. 12B is a detailed block diagram of an exemplary embodiment of the non-cacheable unit (NCU) store queue in the embodiment of FIG. 11.

Referring now to FIG. 11, there is a depicted a detailed block diagram of an exemplary processing unit 104' for data processing system 100 in accordance with a second embodiment of the present invention. As indicated by like reference numerals, processing unit 104' is similar to processing unit 104 of FIG. 2, with two differences apparent. First, the information transmitted from hash logic 206 to L2 cache slices 230a-230n and NCU 232 includes, in addition to the operation, a SOS indication and a thread identifier, a single bit virtual sync (VSYNC) flag. As described in detail below, hash logic 206 transmits the VSYNC flag to represent a barrier operation without explicitly inserting the barrier operation within the operation flow. Second, processing unit 104' additionally includes VSYNC control logic 240, which serves to process VSYNCs in a manner similar to the processing of barrier operations by barrier control logic 234 described above with reference to FIG. 10. In particular, VSYNC control logic 240 is coupled to receive VSYNC done signals 242 from each of L2 cache slices 230a-230n and NCU 232 and provides a VSYNC clear signal 244 to each of L2 cache slices 230a-230n when each of L2 cache slices 230a-230n and NCU 232 has asserted its VSYNC done signal 242.

With reference now to FIG. 12A, there is illustrated a detailed block diagram of an exemplary embodiment of the L2 STQ 304' in the processing unit embodiment shown in FIG. 11. As can be seen by comparison with FIG. 4A, L2 STQ 304' of FIG. 12A is constructed similarly to L2 STQ 304 of FIG. 4A with the exception that each entry 400 of L2 STQ 304' includes two additional fields: an SOS field 414 that is set to identify an entry 400 as containing a strongly ordered store (SOS) operation and a VSYNC field 416 that is set to indicate the presence of a VSYNC in L2 STQ 304' prior to the operation contained in the associated entry 400. Because VSYNCs are inserted by hash logic 206 into the operation flow in lieu of explicit barrier operations, the availability of entries 400 within L2 STQ 304' is enhanced.

Referring now to FIG. 12B, there is depicted a detailed block diagram of an exemplary embodiment of the NCU STQ 420' in the processing unit embodiment depicted in FIG. 11. As can be seen by comparison with FIG. 4B, NCU STQ 420' of FIG. 12B is constructed similarly to NCU STQ 420 of FIG. 4B with the exception that each entry 430 of NCU STQ 420' includes an additional VSYNC counter (VC) field 442, which may include, for example, 4 bits. The VC field 442 of an entry 430 simply counts the number of VSYNCs preceding the operation buffered in that entry 430. In the depicted embodiment, a VC field 442 is employed in lieu of a VSYNC field, such as VSYNC field 416, because of the disparity in queue depth between L2 STQ 304' and NCU STQ 420'.

Figure 13:
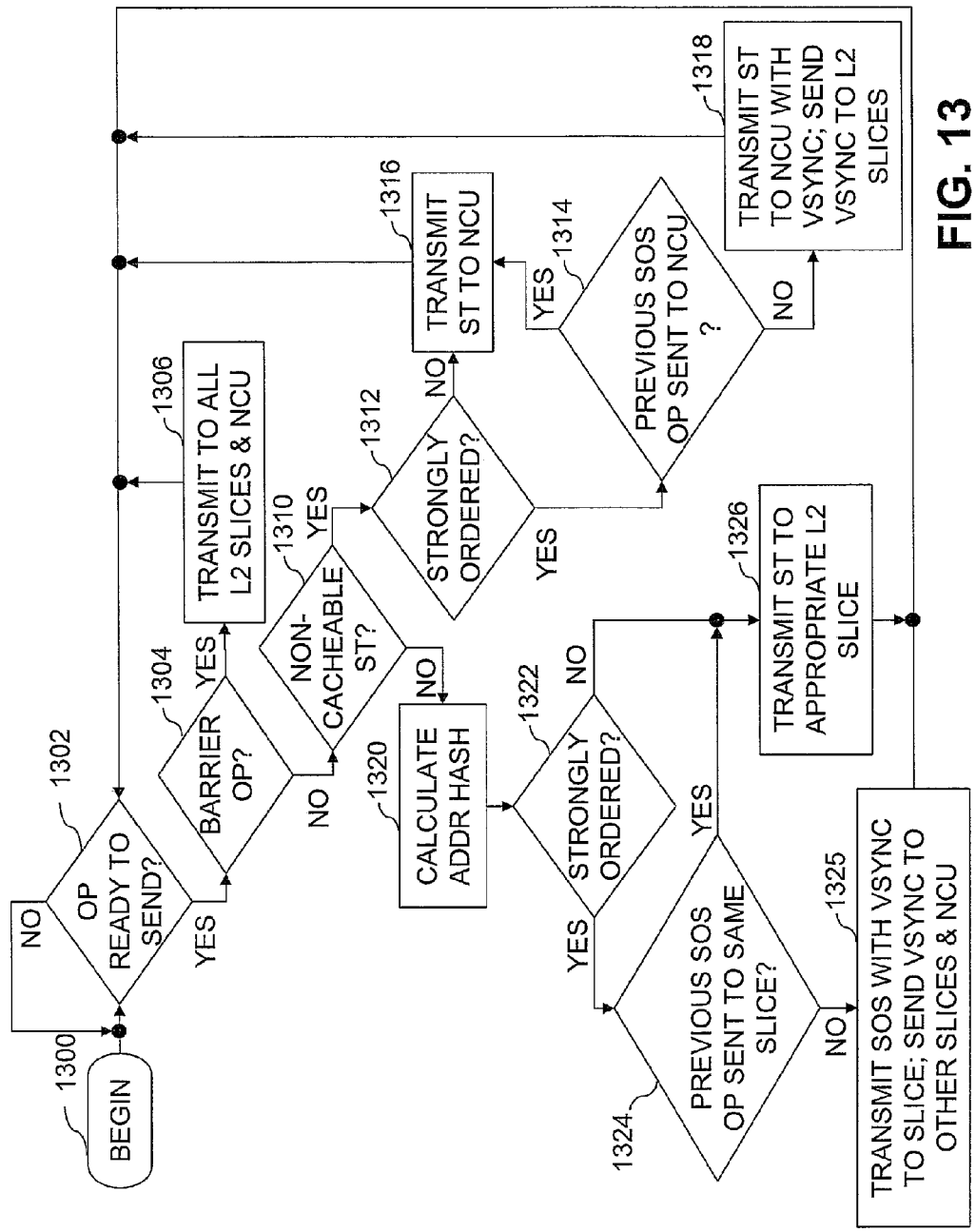
FIG. 13 is a high level logical flowchart of an exemplary process of dispatching operations to the memory subsystem in the embodiment of FIG. 11.

With reference now to FIG. 13, there is illustrated a high level logical flowchart of an exemplary process by which hash logic 206 dispatches operations to the memory subsystem in the processing unit embodiment of FIG. 11. As depicted, the process begins at block 1300 and then proceeds to block 1302, which illustrates hash logic 206 iterating until a store or barrier operation is received from LSU 202. In response to receipt of a store or barrier operation to dispatch, the process passes from block 1302 to block 1304, which depicts hash logic 206 determining from the ttype of the operation received from LSU 202 whether the operation is a barrier operation that synchronizes store operations across all L2 cache slices 230a-230n and NCU 232. If hash logic 206 determines at block 1304 that the operation received from LSU 202 is a barrier operation, the process passes to block 1306, which illustrates hash logic 206 transmitting the barrier operation together with a thread indication to all L2 cache slices 230a-230n and NCU 232. Thereafter, the process returns to block 1302.

Returning to block 1304, in response to a determination that the operation received from LSU 202 is not a barrier operation, hash logic 206 also determines at block 1310 whether or not the ttype of the operation indicates that the operation is a non-cacheable store operation targeting a non-cacheable real address. If so, hash logic 206 also determines at block 1312 whether or not LSU 202 asserted the SOS indication associated with the operation. If not, hash logic 206 transmits the non-cacheable store operation to NCU 232 for processing together with a thread indication, as indicated at block 1316. Thereafter, the process returns to block 1302.

If, however, hash logic 206 determines at block 1312 that LSU 202 asserted the SOS indication associated with the operation received at block 1302, hash logic 206 further determines at block 1314 by reference to an internal scoreboard whether the immediately previous SOS operation was sent to NCU 232. If so, no synchronization need be enforced, and hash logic 206 simply transmits the SOS operation to NCU 232 at block 1316 as described above. If, however, hash logic 206 determines that the immediately previous SOS operation was not dispatched to NCU 232, hash logic 206 synchronizes the completion of all previous store operations in the same thread by transmitting the store operation and thread identifier to NCU 232 with the VSYNC flag set to indicate a VSYNC preceding the SOS operation (block 1318). As further shown at block 1318, hash logic 206 also transmits a VSYNC flag and thread identifier to all L2 cache slices 230a-230n to ensure that all store operations in the thread preceding the VSYNC operation are performed before any subsequent store operation in the thread is performed. Following block 1316 or block 1318, the process returns to block 1302.

Referring again to block 1310, in response to a determination that the operation received from LSU 202 is not a barrier operation or a non-cacheable store operation, but is instead a cacheable store operation, the process passes to block 1320. Block 1320 depicts hash logic 206 hashing the real address specified by the cacheable store operation to identify the appropriate one of L2 cache slices 230a-230n to process the cacheable store operation. Hash logic 206 also determines at block 1322 whether or not LSU 202 asserted the SOS indication in conjunction with the operation. If not, hash logic 206 transmits the cacheable store operation and a thread identifier to the appropriate one of L2 cache slices 230a-230n for processing, as indicated at block 1326. If hash logic 206 determines at block 1322 that the operation received from LSU 202 is a strongly ordered store (SOS) operation, hash logic 206 further determines at block 1324 by reference to an internal scoreboard whether the immediately previous SOS operation was sent to the same L2 cache slice 230. If so, no synchronization need be enforced, and hash logic 206 simply transmits the SOS operation to the appropriate L2 cache slice 230 at block 1326 as described above.

If, however, hash logic 206 determines that the immediately previous SOS operation was not dispatched to the relevant L2 cache slice 230, hash logic 206 synchronizes the completion of all previous store operations in the same thread by transmitting the store operation and thread identifier to the L2 cache slice 230 with the VSYNC flag set to indicate a VSYNC preceding the SOS operation (block 1325). As further shown at block 1325, hash logic 206 also transmits a VSYNC flag and thread identifier to all other L2 cache slices 230a-230n and NCU 232 to ensure that all store operations in the thread preceding the VSYNC operation are performed before any subsequent store operation in the thread is performed. Following block 1325 or block 1326, the process returns to block 1302.

Figure 14:
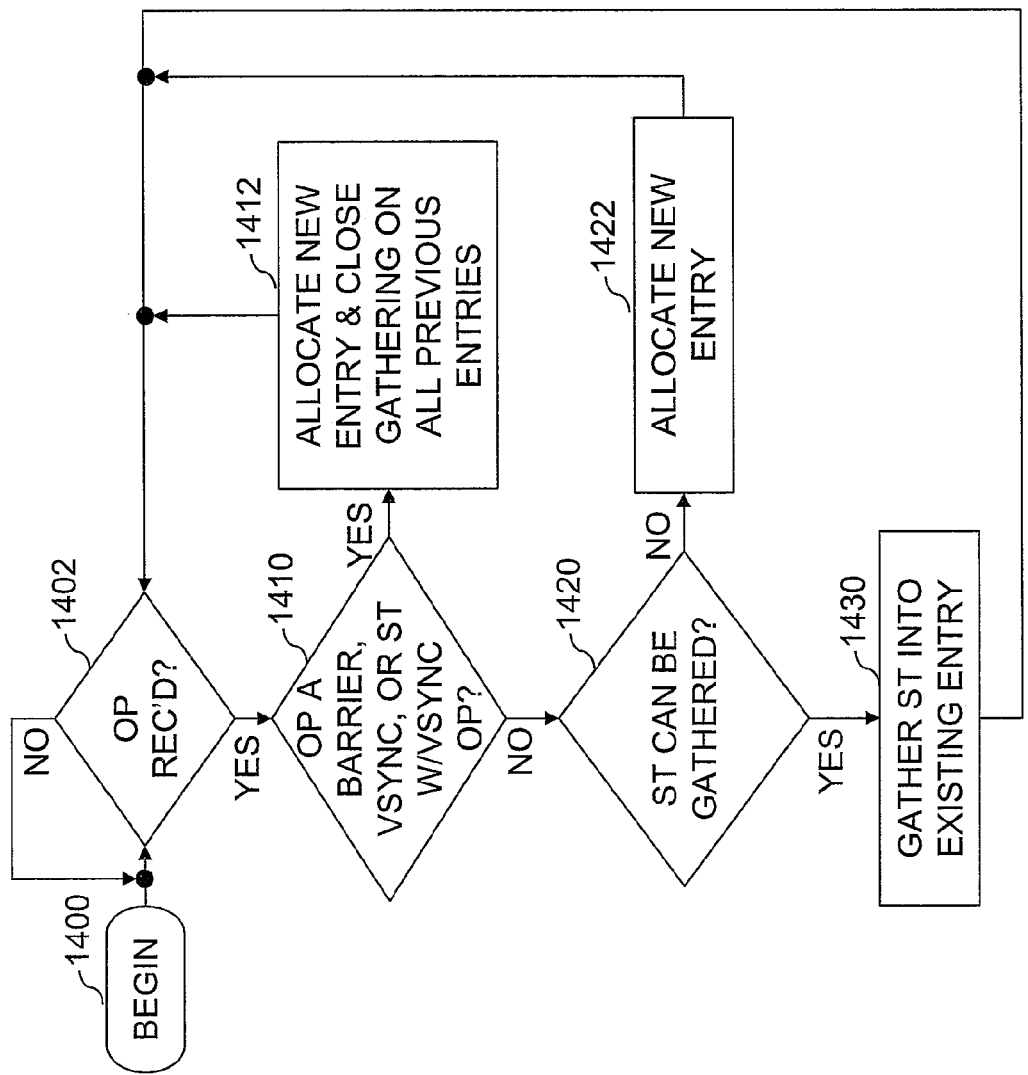
FIG. 14 is a high level logical flowchart of an exemplary process of enqueuing an operation in an L2 store queue in accordance with the embodiment of FIG. 11.

Referring now to FIG. 14, there is depicted a high level logical flowchart of an exemplary process of enqueuing an operation in an L2 store queue in accordance with the processing unit embodiment of FIG. 11. The illustrated process begins at block 1400 and iterates at block 1402 until an operation is received from hash logic 206. In response to receipt of an operation, the process passes to block 1410, which depicts L2 STQ controller 412 determining from the ttype of the received operation whether or not the operation is any of a barrier operation, a VSYNC operation, or a store operation with VSYNC flag set. If so, L2 STQ controller 412 allocates a new entry 400 to the operation in the buffer storage for the appropriate thread and populates the relevant fields (block 1412). In addition, as further illustrated at block 1412, L2 STQ controller 412 closes store gathering on all previous valid entries 400 for the thread within L2 STQ 304'. Thereafter, the process returns to block 1402 to await receipt of a next operation.

Returning to block 1410, in response to determining that the operation received at block 602 is a cacheable store operation without the associated VSYNC flag set, L2 STQ controller 412 determines at block 1420 whether or not the store operation can be gathered in a previously allocated entry 400. For example, if the immediately previous entry 400 contains only a VSYNC (as indicated by VSYNC field 416 and valid field 402 being set and address field 404, ttype field 406 and data field 408 being empty), the store operation can be gathered into the immediately previous entry. Additionally, if the target real address of the cacheable store operation falls within the same memory block as the target address of a previous store operation in the same thread having a valid entry 400 in L2 STQ 304 for which store gathering has not been closed, the store operation can be gathered. In response to a determination at block 1420 that the store operation can be gathered, L2 STQ controller 412 gathers the new cacheable store operation into the identified previously allocated entry 400 as shown at block 1430. L2 STQ controller 412 performs the gathering by merging the data of the new cacheable store operation with the contents of the data field 408 of the entry 400 and, if the previously allocated entry was for a VSYNC only, by updating address field 404, ttype field 406 and data field 408.

If L2 STQ controller 412 determines at block 1420 that the new cacheable store operation cannot be gathered, L2 STQ controller 412 allocates a new entry 400 to the cacheable store operation in the buffer storage of the appropriate thread and populates valid field 402 (i.e., by marking the entry 400 valid), address field 404, ttype field 406, and data field 408 (block 1422). Following either block 1422 or block 1430, the process returns to block 1402.

Figure 15:
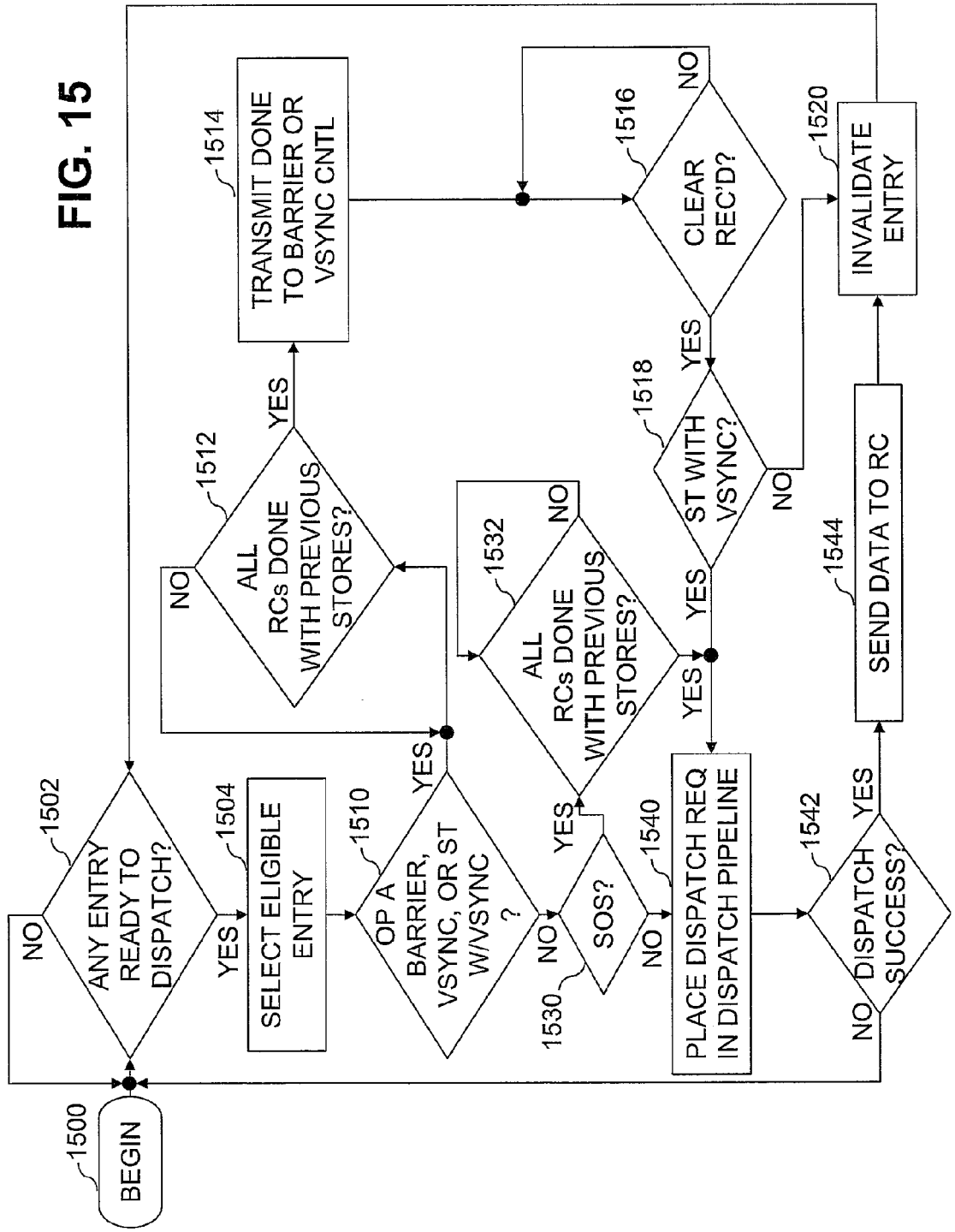
FIG. 15 is a high level logical flowchart of an exemplary process for dequeuing an operation from an L2 store queue in accordance with the embodiment of FIG. 11.

With reference now to FIG. 15, there is illustrated a high level logical flowchart of an exemplary process for dequeuing an operation from an L2 store queue in accordance with the processing unit embodiment of FIG. 11. As depicted, the process begins at block 1500 and then proceeds to block 1502, which depicts L2 STQ controller 412 iterating until at least one entry 400 within the buffer storage of a particular thread in L2 STQ 304 becomes available for dispatch. In response to at least one entry 400 becoming available for dispatch, L2 STQ controller 412 selects one of the eligible entries 400 for dispatch at block 1504. It will be appreciated in making the selection of an eligible entry 400, L2 STQ controller 412 observes any synchronizing operations that are present, meaning that L2 STQ controller 412 never dispatches a store operation in advance of a preceding barrier or VSYNC operation and never dispatches a VSYNC or barrier operation in advance of a preceding store operation, but can otherwise dispatch store operations in any order.

The process then proceeds from block 1504 to block 1510, which illustrates L2 STQ controller 412 determining from the ttype field 406 of the selected entry 400 whether the operation is any of a barrier operation, VSYNC operation, or store operation with VSYNC flag set. If not, the process proceeds to block 1530, which is described below. If, however, the selected entry 400 contains a synchronizing operation, L2 STQ controller 412 iterates at block 1512 until all RC machines 312 have completed processing of all previous store operations. Once all previous store operations have completed, L2 STQ controller 412 asserts its barrier done signal 236 if the selected entry 400 contains a barrier operation and asserts its VSYNC done signal 242 if the selected entry 400 contains a VSYNC (block 1514).

The process then proceeds to block 1516, which depicts L2 STQ controller 412 awaiting assertion of barrier clear signal 238 by barrier control logic 234 (for barrier operations) or assertion of VSYNC clear signal 244 by VSYNC control logic 240 (for VSYNC operations). As described above, a clear signal is asserted when all of L2 cache slices 230a-230n and NCU 232 assert all of the corresponding done signals 236 or 242. In response to assertion of clear signal 238 or 242, L2 STQ controller 412 then determines at block 1518 whether or not the selected entry 400 also contains a cacheable store operation. If not, the process passes directly to block 1520, which illustrates L2 STQ controller 412 marking the selected entry 400 as invalid. Thereafter, the process shown in FIG. 15 returns to block 1502. If, however, the selected entry 400 also contains a store operation, the process passes to block 1540, which is described below.

Referring now to block 1530, if the operation buffered in the selected entry 400 of L2 STQ 304 does not contain a synchronizing operation but is instead only a cacheable store operation, L2 STQ controller 412 determines by reference to SOS field 414 of the selected entry whether the store operation is a strongly ordered store. If so, L2 STQ controller 412 iterates at block 1532 until all RC machines 312 have completed processing of all previous store operations. The process then passes to block 1540.

Block 1540 depicts L2 STQ controller 412 placing a dispatch request within dispatch pipeline 306. As depicted at block 1542, if the dispatch request not granted, the process returns to block 1502. If, however, an indication is received that an RC machine 312 has been dispatched to handle the store operation, the process proceeds from block 1542 to block 1544, which illustrates L2 STQ controller 412 transmitting the contents of data field 408 to the appropriate RC machine 312 for processing. As described above, the RC machine 312 processes the store operation by storing the associated data within cache array 302. Following block 1544, the process passes to blocks 1520 and 1502, which have been described.

Figure 16:
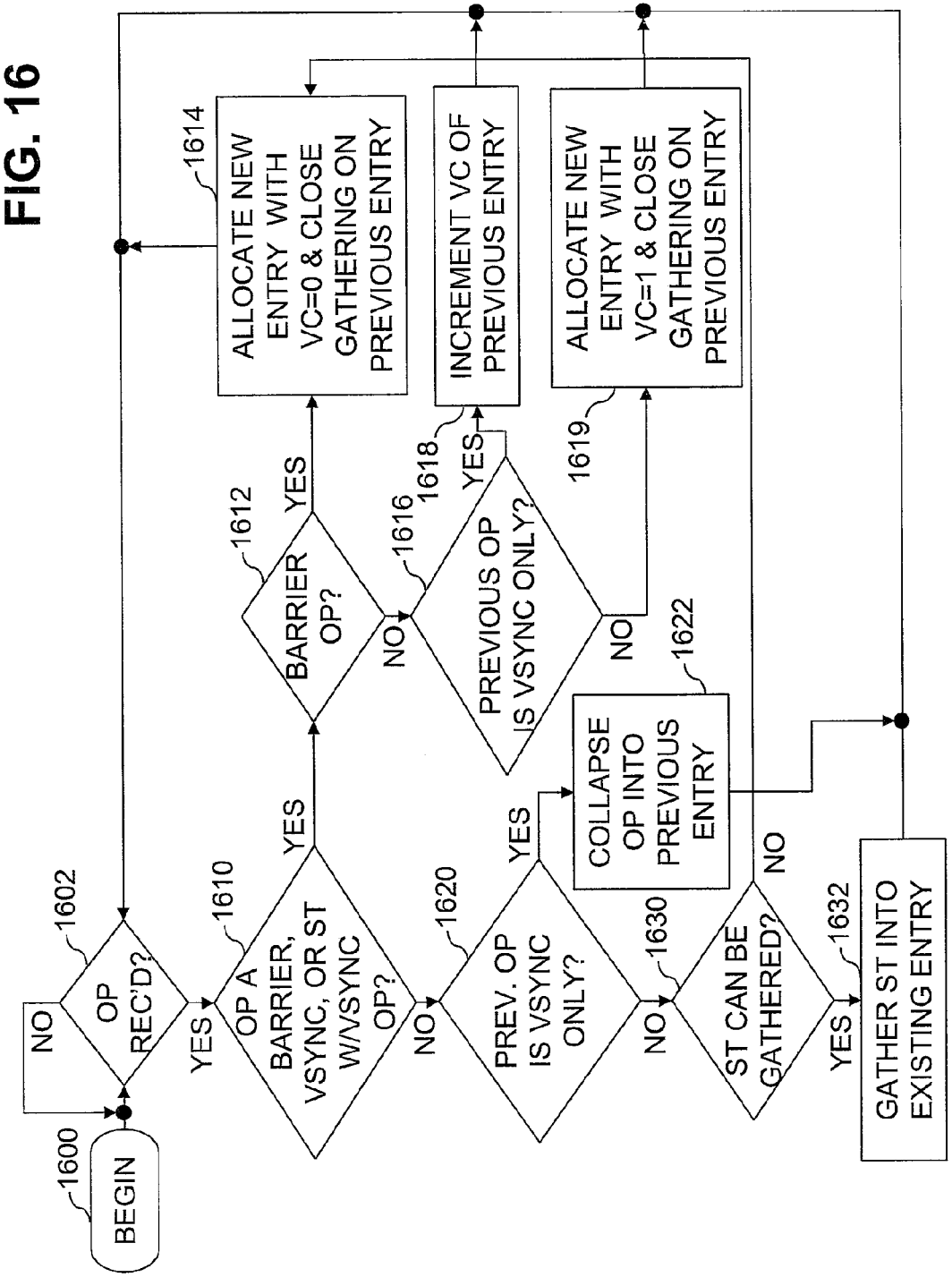
FIG. 16 is a high level logical flowchart of an exemplary process of enqueuing an operation in an NCU store queue in accordance with the embodiment of FIG. 11.

Referring now to FIG. 16, there is depicted a high level logical flowchart of an exemplary process of enqueuing an operation in an NCU store queue in accordance with the processing unit embodiment of FIG. 11. The illustrated process begins at block 1600 and iterates at block 1602 until an operation is received from hash logic 206. In response to receipt of an operation, the process passes to block 1610, which depicts NCU STQ controller 440 determining from the ttype and VSYNC flag of the received operation whether or not the operation is any of a barrier operation, VSYNC operation or store operation with VSYNC flag set. If not, the process proceeds to block 1620, which is described below. If, on other hand, an affirmative determination is made at block 1610 and NCU STQ controller 440 determines at block 1612 that the received operation is a barrier operation, NCU STQ controller 440 allocates a new entry 430 to the barrier operation in the buffer storage for the appropriate thread, populates valid field 402 and ttype field 406, and sets VC 442 to 0 (block 1614). In addition, NCU STQ controller 440 closes store gathering on the previous entry 430 for the thread within NCU STQ 304. Thereafter, the process returns to block 1602 to await receipt of a next operation.

Returning to block 1610, in response to a determination that the operation received at block 1602 is a VSYNC-only operation, represented in FIG. 16 by a positive determination at block 1610, a negative determination at block 1612 and a positive determination at block 1616, the process passes to block 1618. Block 1618 represents NCU STQ controller 440 collapsing the VSYNC into the immediately previous entry 430 for the relevant thread by incrementing the VC 442 by 1. Thereafter, the process returns to block 1602, which has been described.

Referring again to block 1610, if NCU STQ controller 440 determines at block 1610 that the received operation is a non-cacheable store operation with VSYNC flag set, the process passes through blocks 1612 and 1616 to block 1619. At block 1619, NCU STQ controller 440 allocates a new entry 430 to the barrier operation in the buffer storage for the appropriate thread, populates valid field 402 and ttype field 406, and sets VC 442 to 1 to represent the VSYNC (block 1619). In addition, NCU STQ controller 440 closes store gathering on the previous entry 430 for the thread within NCU STQ 304. Thereafter, the process returns to block 1602 to await receipt of a next operation.

Referring now to block 1620, NCU STQ controller 440 determines whether or not the immediately previous entry 430 for the same thread as the newly received operation is allocated to a VSYNC-only operation. If so, NCU STQ controller 440 collapses the non-cacheable store operation into the immediately previous entry 430 for the relevant thread by populating address field 434, ttype field 436 and data field 438 with the information for the non-cacheable store operation (block 1622). Thereafter, the process returns to block 1602, which has been described.

If, however, negative determination is made at block 1620, NCU STQ controller 440 determines at block 1630 whether or not the target real address of the non-cacheable store operation falls within the same memory block as the target address of the immediately previous store operation in the same thread having a valid entry 430 and whether store gathering for the immediate previous entry has been closed. If both determinations are affirmative, NCU STQ controller 440 determines at block 1630 that the present non-cacheable store operation can be gathered with the immediately previous non-cacheable store operation. Accordingly, NCU STQ controller 440 gathers the new non-cacheable store operation by merging the data of the new cacheable store operation with the contents of the data field 408 of the entry 400 allocated to the previous non-cacheable store operation (block 1632). As will be appreciated, such store gathering advantageously saves the allocation of an additional entry 430 in NCU STQ 420. If NCU STQ controller 440 determines at block 1630 that the new non-cacheable store operation cannot be gathered, NCU STQ controller 440 allocates a new entry 430 to the non-cacheable store operation in the buffer storage of the appropriate thread and populates valid field 432 (i.e., by marking the entry 430 valid), address field 434, ttype field 436, and data field 408 (block 1614). In addition, because NCU STQ controller 440 enforces FIFO ordering, NCU STQ controller 440 closes store gathering on all previous store operation in the same thread. Following either block 1614 or block 1632, the process returns to block 1602.

Figure 17:
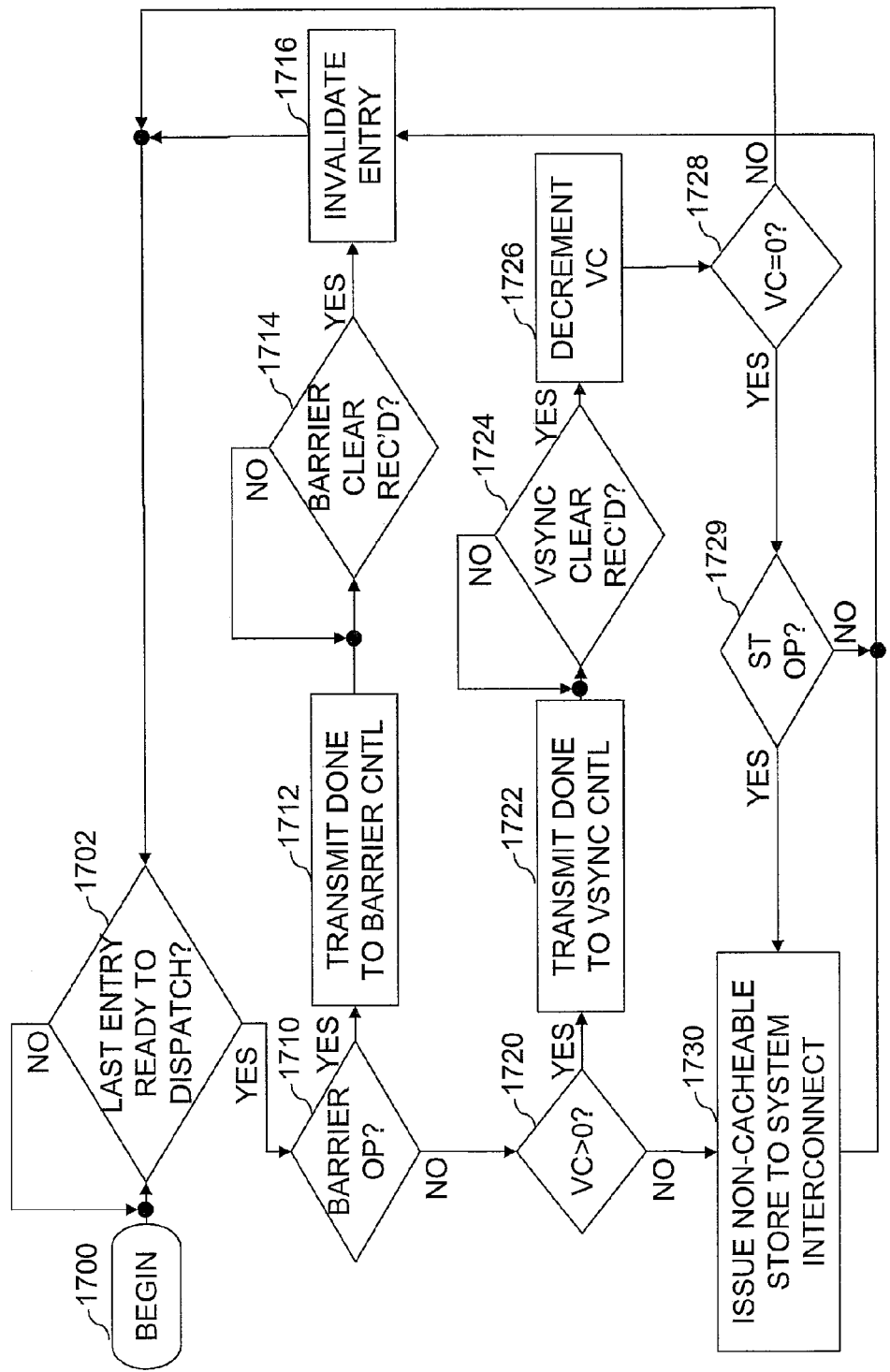
FIG. 17 is a high level logical flowchart of an exemplary process of dequeuing an operation from an NCU store queue in accordance with the embodiment of FIG. 11.

With reference now to FIG. 17, there is illustrated a high level logical flowchart of an exemplary process of dequeuing an operation from an NCU store queue in accordance with the processing unit embodiment of FIG. 11. As depicted, the process begins at block 1700 and then proceeds to block 1702, which depicts NCU STQ controller 440 iterating until the oldest entry 430 within the buffer storage of a particular thread in NCU STQ 420 becomes available for dispatch. As shown at block 1710, NCU STQ controller 440 also determines from the ttype field 436 of the oldest entry 430 if the operation in that entry 430 is a barrier operation. If not, the process proceeds to block 1720, which is described below. If, however, the oldest entry 430 contains a barrier operation, NCU STQ controller 440 asserts its barrier done signal 236, as shown at block 1712, and awaits assertion of barrier clear signal 238 by barrier controller 234 at block 1714. As described above, barrier controller 234 asserts barrier clear signal 238 when all of L2 cache slices 230a-230n and NCU 232 assert all of barrier done signals 236. In response to assertion of barrier clear signal 238, NCU STQ controller 440 marks the entry 430 containing the barrier operation as invalid at block 1716. Thereafter, the process shown in FIG. 17 returns to block 1702.

Referring now to block 1720, if the operation buffered in the oldest entry 430 of the buffer storage of the present thread in NCU STQ 420 is not a barrier operation but is instead a non-cacheable store operation, NCU STQ controller 440 determines if the VC field 442 of the entry 430 has a count value greater than zero, representing the presence of one or more VSYNCs preceding the non-cacheable store operation within the entry 430. If not, the process passes to block 1730, which is described below. If so, NCU STQ controller 440 asserts its VSYNC done signal 242, as shown at block 1722, and awaits assertion of VSYNC clear signal 244 by VSYNC controller 240 at block 1724. As described above, VSYNC controller 240 asserts VSYNC clear signal 244 when all of L2 cache slices 230a-230n and NCU 232 assert all of VSYNC done signals 236 for the given thread. In response to assertion of VSYNC clear signal 244, NCU STQ controller 440 decrements VC field 442 for the entry 430 at block 1726 and again tests its value at block 1728. If the count value contained in VC field 442 is still greater than zero, representing one or more additional VSYNCs, the process returns to block 1702. If, however, all VSYNC(s) in the entry have been processed, as indicated by a count value of zero, the process passes to block 1729.

Block 1729 represents NCU STQ controller 440 determining by reference to ttype field 436 whether or not the oldest entry 440 also contains a non-cacheable store operation. If not, the process passes to block 1716, which has been described. If so, the process proceeds to block 1730, which depicts NCU STQ controller 440 issuing the non-cacheable store operation on local interconnect 114 (and possibly system interconnect 110). Following block 1730, the process passes to blocks 1716 and 1702, which have been described.

As has been described, the present invention provides an improved data processing system, processing unit and method of data processing that support the concurrent processing of program code implementing diverse memory models. In particular, by inserting synchronizing operations, whether virtual or actual, within the operation flow of a hardware thread as needed based upon a current mode of execution for that thread, the present invention permits both strongly ordered and weakly ordered store operations to be performed appropriately from common store queues. The present invention also provides support for the application of this technique to data processing systems in which a cache memory is partitioned into address-hashed slices and to non-cacheable store operations.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A data processing system, comprising:
    a processor core; and
    a memory subsystem coupled to the processor core, said memory subsystem including:
        a store queue having a plurality of entries, wherein each of said plurality of entries includes an address field for holding the target address of store operation, a data field for holding data for the store operation, and a virtual sync field indicating a presence or absence of a synchronizing operation associated with said entry; and
        store queue controller, responsive to receipt at the memory subsystem of a sequence of operations including a synchronizing operation and a particular store operation, places a target address and data of the particular store operation within the address field and data field, respectively, of an entry in the store queue and sets the virtual sync field of the entry to represent said synchronizing operation, such that a number of store queue entries utilized is reduced.

2. The data processing system of claim 1, wherein:
    said virtual sync field comprises a multi-bit counter; and
    said store queue controller increments said multi-bit counter to indicate a presence of a synchronizing operation to be processed.

3. The data processing system of claim 1, wherein:
    said processor core concurrently executes instructions within multiple hardware threads; and
    said store queue controller, responsive to a synchronizing operation indicated by the virtual sync field, observes ordering between operations within a first thread independently of an ordering of store operations in a second thread, such that all store operations preceding said synchronizing operation with the first thread complete before store operations subsequent to said synchronizing operation in the first thread.

4. The data processing system of claim 1, wherein:
    said memory subsystem comprises a cache memory including multiple slices, wherein each slice is associated with a respective set of memory addresses and has its own respective store queue; and
    said processor core comprises hash logic that hashes target memory addresses of store operations to identify the slices of cache memory to perform particular store operations and dispatches store operations to the identified slices of cache memory.

5. The data processing system of claim 1, and further comprising:
    barrier control logic, coupled to the memory subsystem, that enforces ordering between store operations caused by synchronizing operations.

6. The data processing system of claim 5, wherein:
    said memory subsystem comprises a cache memory including multiple slices, wherein each slice is associated with a respective set of memory addresses;
    each of said multiple slices of the cache memory asserts a respective barrier done signal when a synchronizing operation is processed by that slice; and
    said barrier control logic asserts a barrier clear signal for the synchronizing operation when all of said multiple slices have asserted a barrier done signal for the synchronizing operation.

7. The data processing system of claim 1, wherein said processor core comprises:
    a mode field having a first setting indicating strong ordering between store operations and a second setting indicating weak ordering between store operations, wherein store operations accessing said memory subsystem are associated with either said first setting or said second setting; and
    logic that, based upon settings of said mode field associated with store operations to be performed by said memory subsystem, inserts a synchronizing operation between a store operation associated with said first setting and a store operation associated with said second setting, such that all store operations preceding said synchronizing operation complete before store operations subsequent to said synchronizing operation.

8. A memory subsystem for a data processing system, said memory subsystem comprising:
    a store queue coupled to receive a sequence of operations from a processor core of the data processing system, said store queue having a plurality of entries, wherein each of said plurality of entries includes an address field for holding the target address of store operation, a data field for holding data for the store operation, and a virtual sync field indicating a presence or absence of a synchronizing operation associated with said entry; and
    store queue controller, responsive to receipt at the memory subsystem of a sequence of operations including a synchronizing operation and a particular store operation, places a target address and data of the particular store operation within the address field and data field, respectively, of an entry in the store queue and sets the virtual sync field of the entry to represent said synchronizing operation, such that a number of store queue entries utilized is reduced.

9. The memory subsystem of claim 8, wherein:
    said virtual sync field comprises a multi-bit counter; and
    said store queue controller increments said multi-bit counter to indicate a presence of a synchronizing operation to be processed.

10. The memory subsystem of claim 8, wherein:
    said processor core concurrently executes instructions within multiple hardware threads; and
    said store queue controller, responsive to a synchronizing operation indicated by the virtual sync field, observes ordering between operations within a first thread independently of an ordering of store operations in a second thread, such that all store operations preceding said synchronizing operation with the first thread complete before store operations subsequent to said synchronizing operation in the first thread.

11. The memory subsystem of claim 8, wherein:
    said memory subsystem comprises a cache memory including multiple slices, wherein each slice is associated with a respective set of memory addresses and has its own respective store queue.

12. The memory subsystem of claim 11, and further comprising:
   barrier control logic, coupled to said cache memory, that enforces ordering between store operations caused by synchronizing operations.

13. The memory subsystem of claim 12, wherein:
   each of said multiple slices of the cache memory asserts a respective barrier done signal when a synchronizing operation is processed by that slice; and
   said barrier control logic asserts a barrier clear signal for the synchronizing operation when all of said multiple slices have asserted a barrier done signal for the synchronizing operation.

14. A method of data processing in a data processing system, said method comprising:
   a processor core executing store instructions to determine target memory addresses of store operations to be performed by a memory subsystem of the data processing system;
   dispatching a sequence of operations including a synchronizing operation and a store operation to a store queue of the memory subsystem;
   enqueuing within an entry of the store queue a target address and data for the store operation and setting a virtual sync field of the entry to indicate the association of a synchronizing operation with said entry; and
   thereafter, performing a synchronization indicated by the synchronizing operation and memory access indicated by the store operation and deallocating the entry, wherein a number of store queue entries utilized for synchronizing operations is reduced.

15. The method of claim 14, wherein:
   said virtual sync field comprises a multi-bit counter; and
   said setting comprises incrementing said multi-bit counter to indicate a presence of a synchronizing operation to be processed.

16. The method of claim 14, wherein:
   said processor core concurrently executes instructions within multiple hardware threads; and
   said step of performing the synchronization indicated by the synchronizing instruction includes a store queue controller, responsive to a synchronizing operation indicated by the virtual sync field, observing ordering between operations within a first thread independently of an ordering of store operations in a second thread, such that all store operations preceding said synchronizing operation with the first thread complete before store operations subsequent to said synchronizing operation in the first thread.

17. The method of claim 14, wherein:
   said memory subsystem comprises a cache memory including multiple slices, wherein each slice is associated with a respective set of memory addresses and has its own respective store queue; and
   said method further comprises hashing target memory addresses of store operations to identify the slices of cache memory to perform particular store operations; and
   said dispatching comprises dispatching store operations to the identified slices of cache memory.

18. The method of claim 14, wherein:
   said memory subsystem comprises a cache memory including multiple slices, wherein each slice is associated with a respective set of memory addresses;
   said step of performing a synchronization indicated by the synchronizing operation comprises:
      each of said multiple slices of the cache memory asserting a respective barrier done signal when a synchronizing operation is processed by that slice; and
      barrier control logic asserting a barrier clear signal for the synchronizing operation when all of said multiple slices have asserted a barrier done signal for the synchronizing operation.

19. The method of claim 14, wherein:
   said processor core comprises a mode field having a first setting indicating strong ordering between store operations and a second setting indicating weak ordering between store operations, wherein store operations accessing said memory subsystem are associated with either said first setting or said second setting; and
   said method further comprises said processor core dynamically generating and inserting a synchronizing operation between a store operation associated with said first setting and a store operation associated with said second setting, such that all store operations preceding said synchronizing operation complete before store operations subsequent to said synchronizing operation.

* * * * *